(12) United States Patent
Iida et al.

(10) Patent No.: US 7,909,357 B2
(45) Date of Patent: Mar. 22, 2011

(54) AIRBAG APPARATUS

(75) Inventors: Takashi Iida, Aichi-ken (JP); Makoto Yamanaka, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 87 days.

(21) Appl. No.: 12/382,443

(22) Filed: Mar. 17, 2009

(65) Prior Publication Data
US 2009/0236832 A1 Sep. 24, 2009

(30) Foreign Application Priority Data
Mar. 21, 2008 (JP) ................................. 2008-073947

(51) Int. Cl.
B60R 21/20 (2006.01)
B60R 21/213 (2006.01)

(52) U.S. Cl. ................. 280/730.1; 280/730.2; 280/743.1

(58) Field of Classification Search ............... 280/730.1, 280/730.2, 743.1, 743.2
See application file for complete search history.

(56) References Cited

U.S. PATENT DOCUMENTS

| | | | |
|---|---|---|---|
| 6,631,922 B2 * | 10/2003 | Hess et al. | 280/730.2 |
| 7,077,426 B2 * | 7/2006 | Shaker et al. | 280/730.2 |
| 7,364,185 B2 | 4/2008 | Mori et al. | |
| 7,621,558 B2 * | 11/2009 | Mori et al. | 280/730.1 |
| 7,648,160 B2 * | 1/2010 | Mori et al. | 280/730.1 |
| 7,661,701 B2 * | 2/2010 | Hirata | 280/730.2 |
| 2004/0066022 A1 * | 4/2004 | Mori et al. | 280/730.1 |
| 2006/0055153 A1 * | 3/2006 | Hirata | 280/728.1 |
| 2006/0097491 A1 * | 5/2006 | Saberan et al. | 280/730.1 |
| 2006/0138754 A1 * | 6/2006 | Hirata et al. | 280/730.1 |
| 2006/0214401 A1 * | 9/2006 | Hirata | 280/730.1 |
| 2007/0013173 A1 | 1/2007 | Kino et al. | |
| 2008/0143084 A1 * | 6/2008 | Mizuno et al. | 280/730.1 |
| 2008/0174092 A1 | 7/2008 | Mori et al. | |
| 2009/0085330 A1 * | 4/2009 | Ilda et al. | 280/728.2 |

FOREIGN PATENT DOCUMENTS

| | | |
|---|---|---|
| JP | A-2004-58850 | 2/2004 |
| JP | A-2007-22265 | 2/2007 |
| JP | A-2007-261512 | 10/2007 |
| JP | A-2007-302096 | 11/2007 |
| JP | 2008001197 A * | 1/2008 |

* cited by examiner

*Primary Examiner* — Ruth Ilan
*Assistant Examiner* — James English
(74) *Attorney, Agent, or Firm* — Posz Law Group, PLC

(57) ABSTRACT

An airbag 33 has a plurality of vertical inflatable cells 37 to 40 each serving as an inflatable portion and non-inflatable portions 41, 45, each of which is arranged between a corresponding adjacent pair of the vertical inflatable cells 37 to 40 and formed by a fabric sheet 34B. The vertical inflatable cells 37 to 40 are deployed and inflated by inflation gas at positions beside corresponding headrests 14L, 14R of the rearmost seat. In contrast, the non-inflatable portions 41, 45 deploy behind the headrests 14L, 14R without inflating. The vertical inflatable cells 37 to 40 include vertical inflatable cells 38, 39 located at the center of the direction of the width of the vehicle and side vertical inflatable cells 37, 40 arranged at both sides of the direction of the width of the vehicle. A slit 43 and a slit 47, each serving as a displacement permitting portion that permits outward displacement of the corresponding side vertical inflatable cell 37, 40 in the direction of the width of the vehicle, are defined in the non-inflatable portion 41 and the non-inflatable portion 45, respectively. The slits 43, 47 each extend from a distal edge 42, 46 of the corresponding non-inflatable portion 41, 45 toward a proximal portion 33A of the airbag 33.

3 Claims, 15 Drawing Sheets

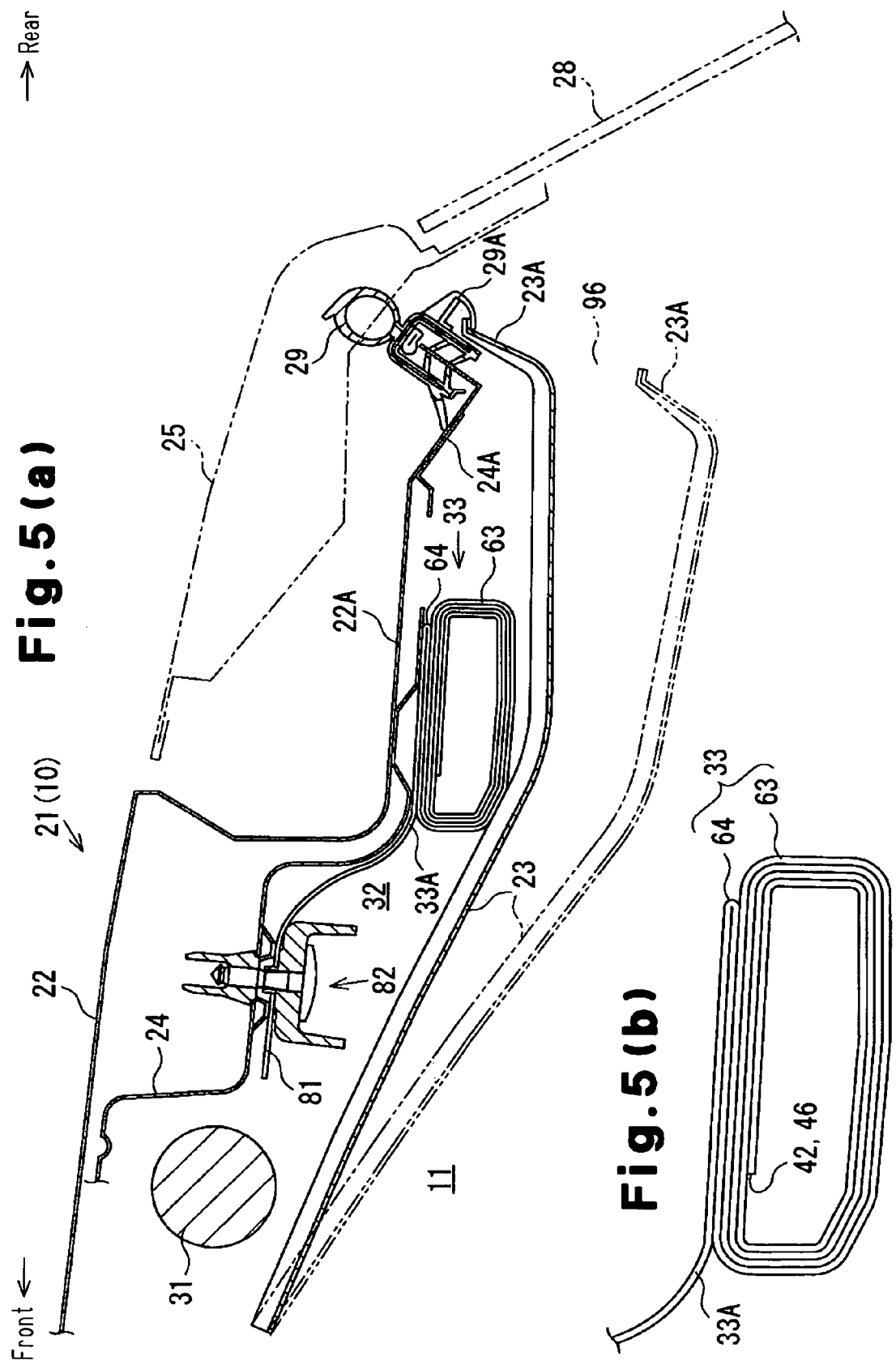

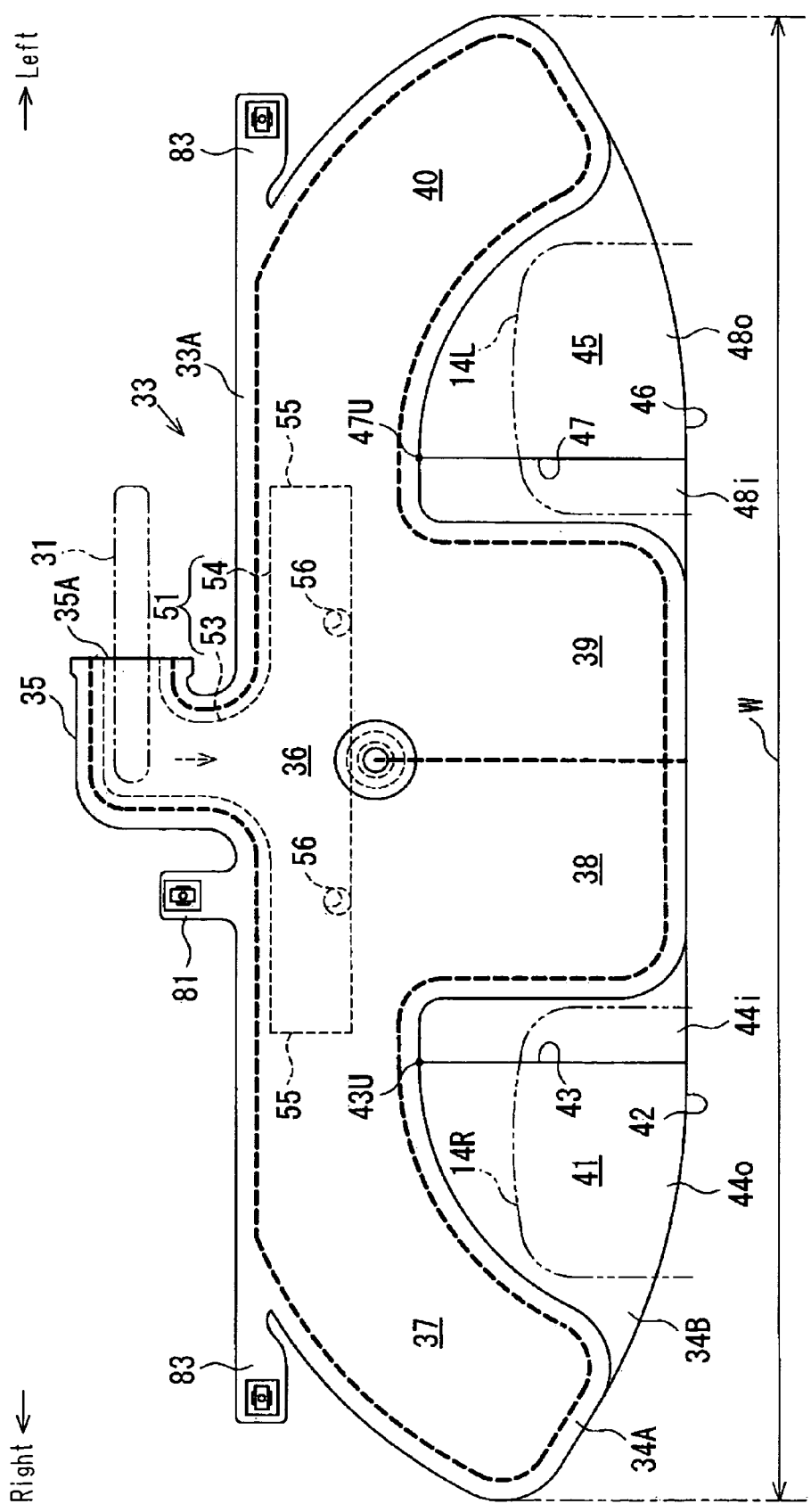

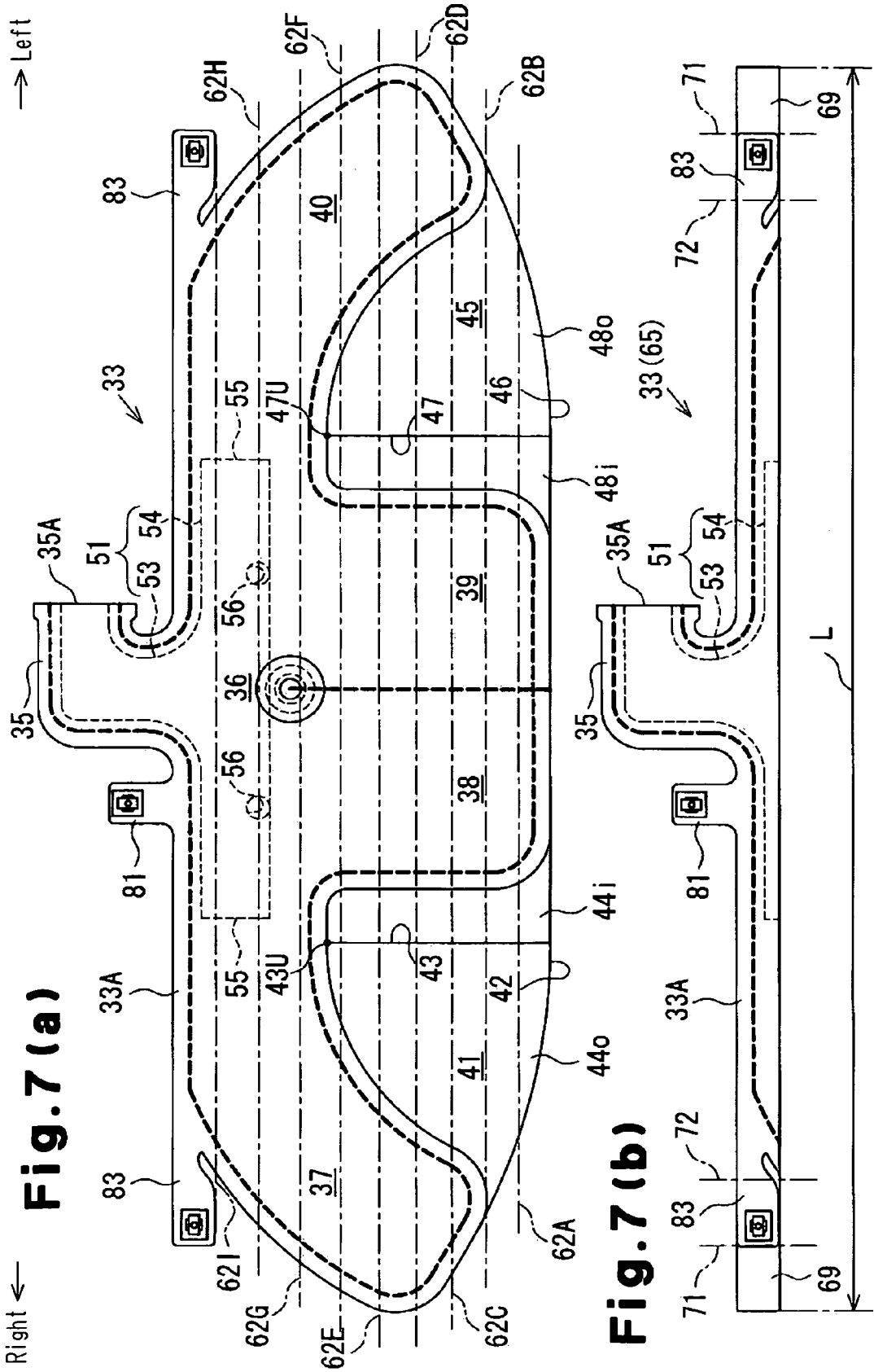

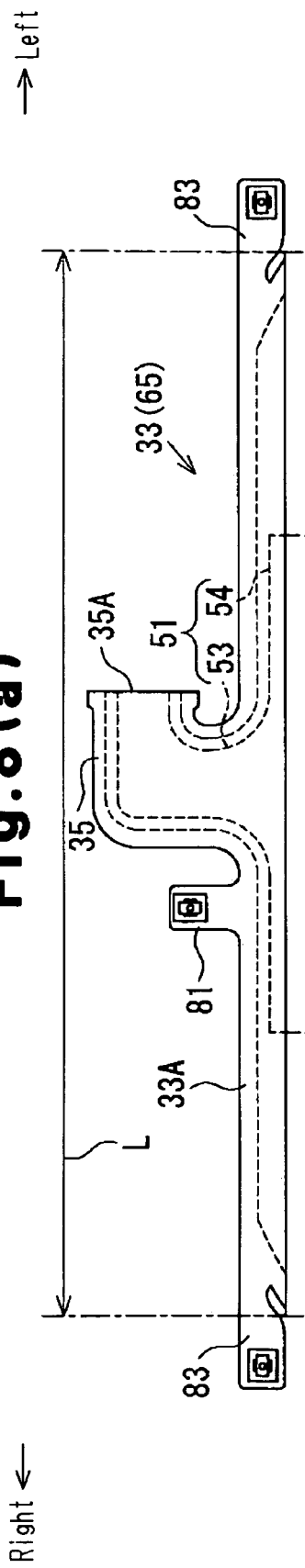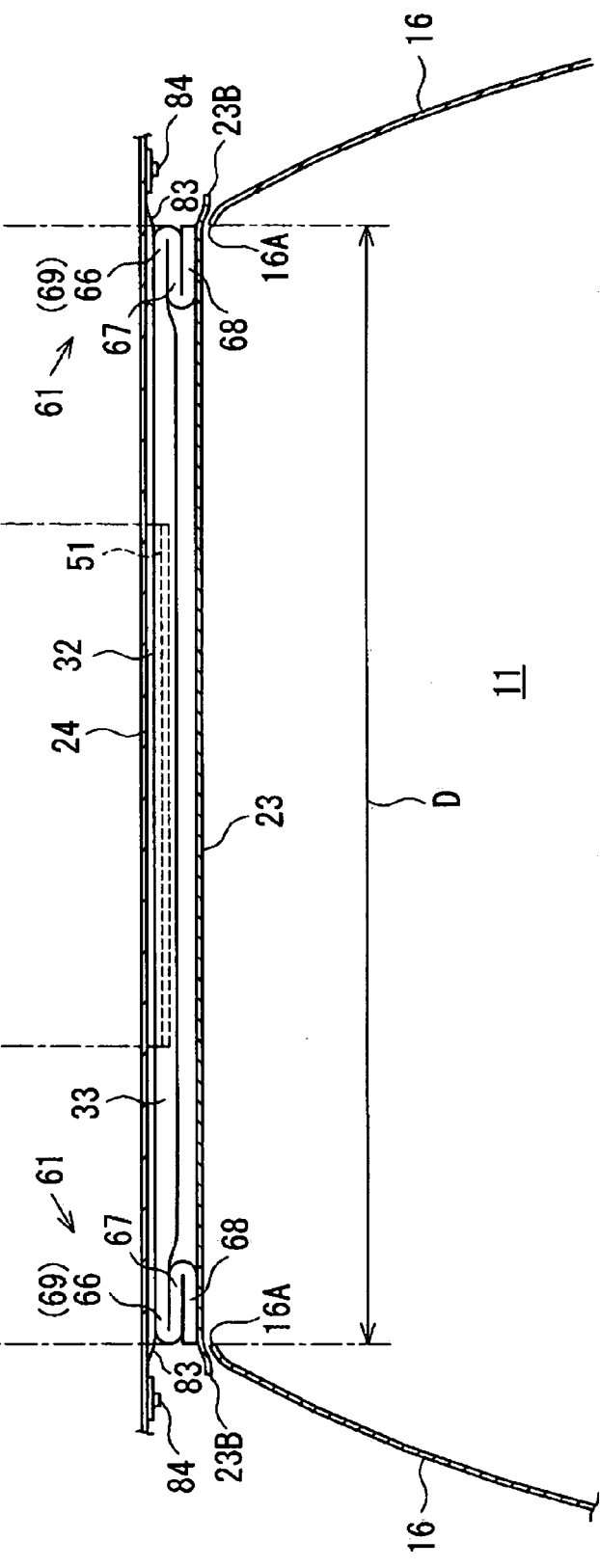

AIRBAG APPARATUS

BACKGROUND OF THE INVENTION

The present invention relates to an airbag apparatus of a vehicle having an airbag that inflates and deploys to protect an occupant in response to impact on the vehicle from behind and, more particularly, to an airbag apparatus that deploys and inflates, behind the rearmost seat, an airbag accommodated in an accommodation portion, which is provided in the space over the ceiling of the passenger compartment.

A rear airbag apparatus is effective in protecting an occupant seated on a rearmost seat when a vehicle is hit by another vehicle from behind and receives impact from behind. The airbag apparatus includes an airbag that deploys and inflates at a position between the rearmost seat and the rear window glass.

Like other types of airbag apparatus, the rear airbag apparatus has an inflator and an airbag as its main components. The inflator and the airbag, which is folded compactly, are accommodated in an accommodation portion provided in the space over the ceiling of the passenger compartment. If the vehicle is hit from behind and receives impact from the rear, the inflator supplies inflation gas to the airbag. The gas causes the airbag to shoot out of the accommodation portion into the passenger compartment. The airbag then deploys and inflates toward the space between the rearmost seat and the rear window glass.

The airbag is arranged between the head of the occupant seated on the rearmost seat and the rear window glass so as to isolate the head of the occupant from the rear window glass. The airbag absorbs the impact applied to the vehicle from behind and reduces the influence on the occupant by flying objects that may enter the passenger compartment from behind the vehicle. Also, change in the posture of the occupant in a rearward direction is suppressed by the airbag.

Japanese Laid-Open Patent Publication No. 2007-302096, for example, discloses this type of airbag apparatus. The apparatus includes a plurality of inflatable portions and a non-inflatable portion formed by fabric that connects each adjacent pair of the inflatable portions. While the inflatable portions are deployed and inflated by inflation gas at a position beside a headrest of a rearmost seat, the non-inflatable portion is deployed behind the headrest without inflating. The non-inflatable portion is provided for the following purposes: reducing the volume of the airbag in a deployed and inflated state; reducing the volume and the costs of the inflator; and improving the occupant protection performance by increasing the speed at which the airbag is deployed and inflated.

In the airbag apparatus, the airbag deploys and inflates rearward and diagonally downward while deploying and inflating in the direction of the width of the vehicle, or applying tension to the non-inflatable portion in the direction of the width of the vehicle. At this stage, the non-inflatable portion, while deploying, may contact the headrest of the rearmost seat. If such contact occurs, the non-inflatable portion interferes with the headrest, making it difficult for the non-inflatable portion to extend beyond the headrest and to deploy appropriately behind the headrest. Specifically, the interference between the non-inflatable portion and the headrest restricts outward deployment and inflation of the airbag in the direction of the width of the vehicle. This attenuates the intensity of the outward deployment and inflation of the airbag.

Particularly, because of recent demands for larger passenger compartment, it is more and more difficult to ensure the accommodation portion for the airbag in a rear end portion of the space over the passenger compartment ceiling. Accordingly, the accommodation portion may be arranged at a position forward of the vehicle compared to conventional cases. In this case, the accommodation portion is moved forward away from the headrest. The above-described interference between the non-inflatable portion and the headrest occurs easily.

SUMMARY OF THE INVENTION

Accordingly, it is an objective of the present invention to provide an airbag apparatus that suppresses interference between a non-inflatable portion and a headrest and is capable of accurately deploying the non-inflatable portion toward a position behind the headrest.

To achieve the foregoing objective and in accordance with a first aspect of the present invention, an airbag apparatus for use in a vehicle is provided. The air bag apparatus includes an inflation fluid generator and an airbag. The inflation fluid generator is accommodated in an accommodation portion formed in a space over a ceiling of a passenger compartment of the vehicle. The inflation fluid generator jets out inflation fluid in response to an impact on the vehicle from behind. The airbag is accommodated in the accommodation portion in a folded state and has a proximal portion fixed to the vehicle. The airbag is connected to the inflation fluid generator and, by receiving at the proximal portion the inflation fluid supplied from the inflation fluid generator in response to the impact on the vehicle from behind, shoots out of the accommodation portion toward a rear portion of the passenger compartment and in a diagonally downward direction, and deploys and inflates behind a rearmost seat with the proximal portion maintained in the accommodation portion. A plurality of inflatable portions and a plurality of non-inflatable portions are defined in the airbag. The inflatable portions are deployed and inflated by the inflation fluid in the vicinity of a lateral side of a headrest of the rearmost seat. Each non-inflatable portion is made of a fabric sheet, arranged between an adjacent pair of the inflatable portions, and deployed behind the headrest without being inflated by the inflation fluid. The inflatable portions include a pair of side inflatable portions arranged at both outer sides in a direction of the width of the vehicle. Each non-inflatable portion is provided with a displacement permitting portion permitting outward displacement of the corresponding one of the side inflatable portions in the direction of the width of the vehicle.

In accordance with a second aspect of the present invention, a method for folding an airbag used in an airbag apparatus installed in a vehicle is provided. A plurality of inflatable portions and a plurality of non-inflatable portions each formed of a fabric sheet are defined in the airbag. The inflatable portions are deployed and inflated by inflation fluid, and the non-inflatable portions are each arranged between adjacent pair of the inflatable portions, and deployed without being inflated by the inflation fluid. The inflatable portions include a pair of side inflatable portions, and each non-inflatable portion is provided with a displacement permitting portion permitting displacement of the corresponding one of the side inflatable portions. A plurality of engagement portions are provided in the vicinity of the displacement permitting portion of each non-inflatable portion. The engagement portions are aligned along the displacement permitting portion and used to position the corresponding non-inflatable portion when an airbag in an spread state is folded. The method includes: mounting the airbag in the spread state on a table having one or more engaging portions; positioning the airbag in the spread state by engaging the engaging portions of the table with the engagement portions of the airbag; and folding the airbag in a volute shape from the distal edge of each non-inflatable portion toward the proximal portion of the non-inflatable portion using an elongated folding assist tool as a core, the non-inflatable portion being engaged with the engagement portions until immediately before the airbag is folded back.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5(A) is a cross-sectional side view showing a rear portion of a roof of the vehicle illustrated in FIG. 1;

FIG. 5(B) is an enlarged cross-sectional side view showing a main portion of the airbag illustrated in FIG. 5(A);

FIG. 6 is a plan view showing the airbag in a spread state;

FIG. 7(A) is a front view representing the relationship between the position of the airbag in the spread state and the positions of the fold lines;

FIG. 7(B) is a front view representing the relationship between the position of a folded intermediate body of the airbag and the positions of the fold lines;

FIG. 8(A) is a plan view illustrating an airbag, which is folded into a shape for accommodation;

FIG. 8(B) is a cross-sectional view schematically showing the airbag accommodated in an accommodation portion;

DETAILED DESCRIPTION OF THE PREFERRED EMBODIMENTS

First Embodiment

A first embodiment of the present invention will now be described with reference to FIGS. 1 to 13. An airbag apparatus according to the present embodiment is installed and used in a vehicle 10. In the following, the traveling direction of the vehicle 10 is defined as a forward direction. With reference to the forward direction, front and rear, up and down, and left and right directions are defined. As of the direction of the width of the vehicle, outward and inward directions are defined with reference to the center of the vehicle 10.

Figure 1:
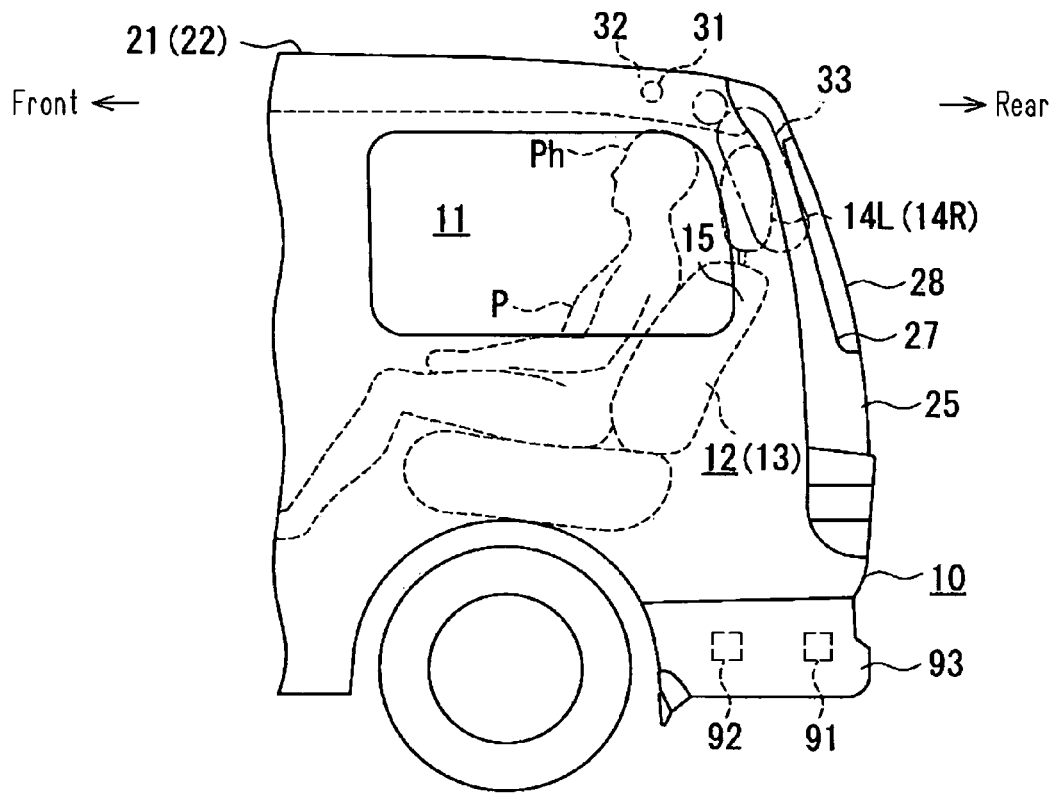
FIG. 1 is a side view illustrating a rear portion of a vehicle in which an airbag apparatus according to a first embodiment of the present invention is installed.
Figure 2:
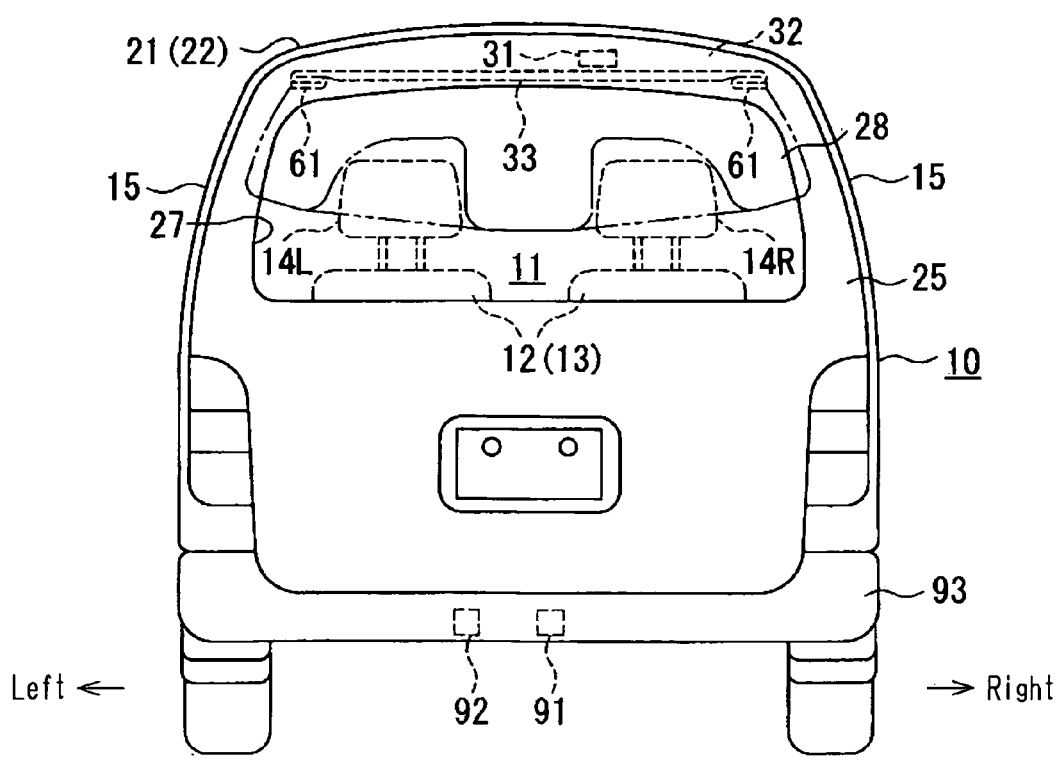
FIG. 2 is a rear view showing the vehicle shown in FIG. 1.

First, the structure of a rear portion of the vehicle 10, in which the airbag apparatus is installed, will be described. As shown in FIGS. 1 and 2, a pair of left and right rear seats 12, which are rearmost seats, are arranged in a rear portion of a passenger compartment 11 of the vehicle 10. Each rear seat 12 has a backrest 13 and headrests 14L, 14R, which is attached to the top of the backrest 13 to support the head Ph of an occupant P.

A rear pillar (C-pillar) extending substantially vertically is provided in each of the left and rear sides of the rear portion of the vehicle 10. The rear pillars 15 are tilted in such a manner that the distance between the rear pillars 15 increases from the upper ends to the lower ends.

Figure 4:
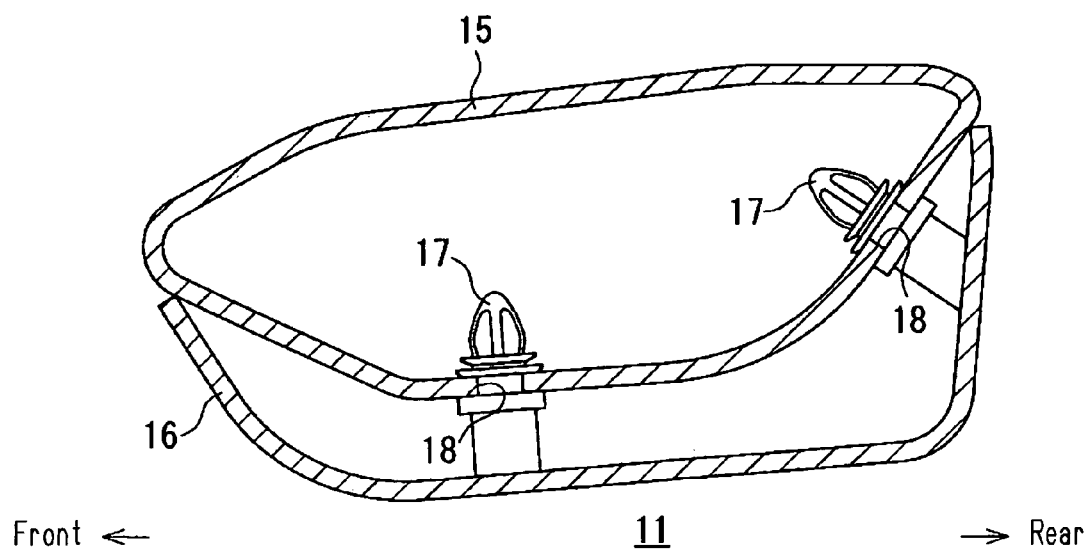
FIG. 4 is a cross-sectional view taken along line 4-4 of FIG. 3.

As shown in FIGS. 4 and 5, a surface of each rear pillar 15 that faces the passenger compartment 11 is covered with a rear pillar garnish 16. Fasteners 17 are provided on a surface of each rear pillar garnish 16 that faces the corresponding rear pillar 15, and fastener holes 18 are provided in the rear pillar 15. Each rear pillar garnish 16 is engaged with the corresponding rear pillar 15 by inserting the fasteners 17 into the fastener holes 18. The rear pillar garnishes 16 thus engaged with the rear pillars 15 are tilted in such a manner that the distance between the garnishes 16 increases from upper ends 16A toward the lower ends, like the rear pillars 15 (refer to FIG. 8(B)).

The space in a rear portion of the passenger compartment 11 is defined by the rear pillar garnishes 16. That is, since the rear pillar garnishes 16 are inclined as described above, the space in a rear portion of the passenger compartment 11 is substantially in a trapezoidal shape with its width increasing from the top to the bottom.

Figure 3:
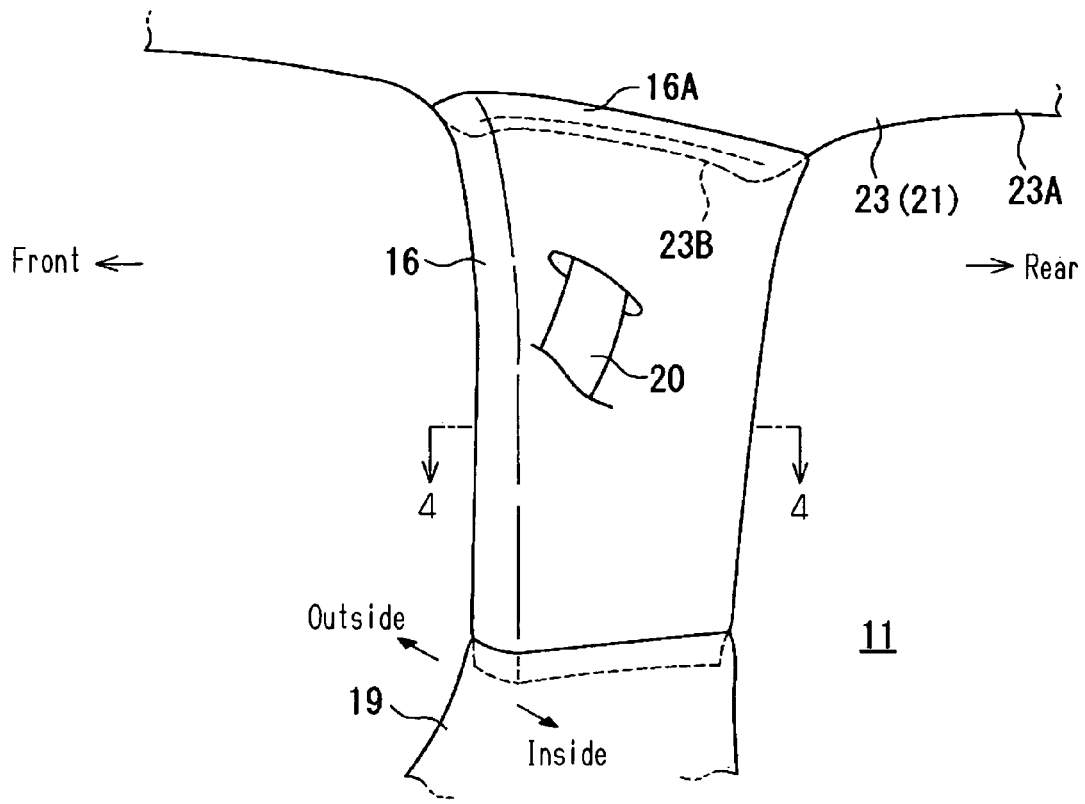
FIG. 3 is a perspective view illustrating a rear pillar garnish and the surrounding structure of the vehicle of FIG. 1, as viewed from the inside of the passenger compartment.

A lower garnish 19 is arranged below each rear pillar garnish 16. Reference numeral 20 in FIG. 3 represents a seatbelt for restraining the occupant P seated on the rear seat 12.

A roof 21 of the vehicle 10 is located above the rear pillars 15 and the rear pillar garnishes 16. As shown in FIG. 5, a rear portion of the roof 21 has a roof panel 22, which is an exterior part, a rear roof headlining 23, which is an ornamental part, and an inner panel 24. The roof panel 22 is formed, for example, of a steel plate. The rear roof headlining 23 is formed, for example, of a flexible material such as a synthetic resin. A rear end 22A of the roof panel 22 is bent to be located below the remaining portion of the roof panel 22.

A rear door 25, which is arranged behind the rear seat 12 (see FIG. 1), is attached to the rear end 22A of the roof panel 22 through a hinge mechanism (not shown) in such a manner that the rear door 25 is selectively opened and closed substantially in a vertical direction. A rear window 27, which is substantially in a trapezoidal shape with its width increasing from the top to the bottom, is provide in an upper half of the rear door 25 (see FIG. 2). A rear window glass 28 is attached to the rear window 27.

As shown in FIG. 8(B), a rear roof headlining 23, or the ceiling of the passenger compartment, is formed of flexible material such as synthetic resin. The rear roof headlining 23 is located above upper ends 16A of the rear pillar garnishes 16, and covers the entire roof panel 22 (see FIG. 5) from below. Left and right edges 23B of the rear roof headlining 23 are each located outside of the upper end 16A of the corresponding rear pillar garnish 16 with respect to the vehicle width direction. As shown in FIG. 5, the rear roof headlining 23 is attached to the roof panel 22 in such a manner that the rear roof headlining 23 is allowed to pivot downward about a portion located forward in the vehicle, which is, for example, a front end portion.

An inner panel 24 is arranged between a rear portion of the roof panel 22 and the rear roof headlining 23 and fixed to the roof panel 22 at least a rear end 24A.

A weatherstrip 29 for sealing is attached to the rear end 22A of the roof panel 22 and the rear end 24A of the inner panel 24. Engaging pieces 29A extend downward from the rear of the weatherstrip 29. The rear end 23A of the rear roof headlining 23 is engaged with the engaging pieces 29A. The engagement strength between the roof panel 22 and the rear roof headlining 23 by means of the engaging pieces 29A is determined such that the roof panel 22 and the roof headlining 23 are disengaged when an airbag 33 (discussed below) is inflated and pushes the rear roof headlining 23 downward.

An airbag apparatus is provided in a rear portion of the vehicle 10. If the vehicle 10 is hit by another vehicle from behind and impact is applied to the vehicle 10 from behind, the airbag apparatus protects an occupant P, particularly, the head Ph of the occupant P (see FIGS. 1 and 11), who is seated on the rear seat 12.

The airbag apparatus includes as its main components an inflator 31 serving as an inflation fluid generator and an airbag 33, which is inflated by inflation gas G (see FIG. 12), or inflation fluid supplied by the inflator 31. The inflator 31 and the airbag 33 are arranged in an accommodation portion 32 in the space over the ceiling of the passenger compartment. The accommodation portion 32 is defined by the inner panel 24 and the rear roof headlining 23. Specifically, the accommodation portion 32 is located forward of the headrests 14L, 14R (see FIG. 1) and between the upper ends 16A (see FIG. 8(B)) of the left and right rear pillar garnishes 16.

Subsequently, the inflator 31 and the airbag 33 of the airbag apparatus will be described.

<Inflator 31>

The inflator 31 has a substantially elongated columnar shape that extends in the direction of the width of the vehicle (a direction perpendicular to the sheet surface of FIG. 5). Multiple types of inflators may be employed as the inflator 31 depending on different modes of generation of the inflation gas G. In the first embodiment, a pyrotechnic type inflator is employed as the inflator 31, which generates the inflation gas G by causing reaction in a gas generating agent retained in the inflator 31. However, a different type from the pyrotechnic type may be employed as the inflator 31. The different type of inflator may be a stored gas type, which breaks a partition wall of a high-pressure gas cylinder retaining high-pressure gas using explosive to jet out the inflation gas G. Alternatively, a hybrid type combining the pyrotechnic type and the stored gas type may be employed.

The inflator 31 is provided in a portion of the accommodation portion 32 that is not easily deformed when the vehicle 10 receives impact from behind, which is, for example, the inner panel 24 that has high rigidity.

<Airbag 33>

The airbag 33 is accommodated in an accommodation portion 32 between the roof panel 22 and the rear roof headlining 23 in a compact state suitable for accommodation, that is, a shape for accommodation.

When a rear impact is applied to the vehicle 10, the inflator 31 and ejects inflation gas G. The airbag 33 is supplied with the inflation gas G from the inflator 31 and pops out of the accommodation portion 32. The airbag 33 is then inflated and deployed between the rear seats 12 and the rear window glass 28.

FIG. 6 shows the airbag 33 in a deployed state. FIGS. 6, 7(A) to 10, and 12 show rear portions of the airbag 33 and the vehicle 10 as viewed backward from inside the passenger compartment 11. The leftward and rightward directions in the drawings are opposite to the leftward and rightward direction of the vehicle 10. Accordingly, the "left" and the "right" in FIG. 6 to 10 and FIG. 12 are opposite to the lateral directions, or the "left" and the "right", with respect to the proceeding direction of the vehicle 10. The directions in FIGS. 13 to 22, which will be described later, are defined similarly.

The airbag 33 has a substantially trapezoidal outline shape having a width W that becomes greater in a downward direction. This allows the airbag 33 to cover a substantially entire portion of the rear window glass 28 (see FIG. 2) when deployed. The airbag 33, which has the aforementioned outline shape, is formed in a bag-like shape by sewing two fabric sheets 34A, 34B (referred to also as panel fabrics), which are formed, for example, by woven fabrics, using sewing threads. The fabric sheets 34A, 34B are each formed of material with high strength and flexibility, which is easily folded. In the drawings, the bold broken lines indicate the stitch formed by the sewing thread. Alternatively, the airbag 33 may be formed by a single fabric sheet. In this case, the single fabric sheet is folded in half at the midline and sewn together at the peripheral portions to be shaped like a bag.

The deploying direction of the airbag 33 will hereafter be described. Deployment of the airbag 33 starts from the proximal end (the upper end as viewed in FIG. 6) of the airbag 33 and proceeds gradually toward the distal end (the lower end as viewed in the drawing). Hereinafter, the direction heading from the proximal end to the distal end of the airbag 33 is defined as the deploying direction. A position forward in the deploying direction indicates a position closer to the distal end of the airbag 33. A position rearward in the deploying direction indicates a position closer to the proximal end of the airbag 33. The rear end (the upper end in FIG. 6) of the deploying direction of the airbag 33 is defined as a proximal portion 33A. The airbag 33, which is accommodated in the accommodation portion 32, is fixed to the vehicle (the inner panel 24) at the proximal portion 33A. A gas supply portion 35 having a supply port 35A is provided at the center of the proximal portion 33A. The inflator 31 is connected to the gas supply portion 35.

The gas supply portion 35 does not necessarily need to be located in the exact center of the airbag 33 in the vehicle width direction, but may be slightly displaced therefrom. Even in this case, the inflation gas G jetted out by the inflator 31 is introduced into both sides of the airbag 33 substantially in a uniform manner. Both sides of the airbag 33 are thus deployed substantially in a uniform manner.

Through sewing, a single lateral inflatable cell 36, a pair of left and right side vertical inflatable cells 37, 40, and two intermediate vertical inflatable cells 38, 39, 45 are defined inside the airbag 33. The inflatable cells 36 to 40 each receive the inflation gas G supplied from the inflator 31 and inflate in cylindrical shapes. The inflatable cells 36 to 40 thus regulate the flow of the gas and thus deployment of the airbag 33.

The lateral inflatable cell 36 guides the inflation gas G to flow outward from the inflator 31 along the vehicle width direction. The lateral inflatable cell 36 extends along the proximal portion 33A of the airbag 33 in the vehicle width direction. A center portion of the lateral inflatable cell 36 in the vehicle width direction is connected to the gas supply portion 35.

The intermediate vertical inflatable cells 38 to 39 are inflated below the lateral inflatable cell 36 to form a center portion of the airbag 33. The intermediate vertical inflatable cells 38, 39 are aligned adjacently along the direction of the width of the vehicle and extend downward. Although the vertical inflatable cells 37 to 40 communicate with the lateral inflatable cell 36, the intermediate vertical inflatable cells 38 and 39 do not directly communicate with each other. The positions of the intermediate vertical inflatable cells 38, 39 in the airbag 33 are the positions corresponding to the space between the two headrests 14L, 14R when the airbag 33 is deployed and inflated, or the positions corresponding to the vicinities of the inner sides of the headrests 14L, 14R.

The left and right side inflatable cells 37, 40 each guide the inflation gas G flowing therein to flow substantially downward from the corresponding end of the lateral inflatable cell 36. The side vertical inflatable cells 37, 40 form outer side portions of the inflated and deployed airbag 33. The side vertical inflatable cells 37, 40 extend slantingly from the ends of the lateral inflatable cell 36 such that the space between the cells 37, 40 gradually increases from the top to the bottom. Each of the side vertical inflatable cells 37, 40 communicates with the lateral inflatable cell 36 at the upper end. The positions of the side vertical inflatable cells 37, 40 in the airbag 33 are the positions corresponding to positions in the vicinity of the outer sides of the headrests 14L, 14R when the airbag 33 is deployed and inflated. In other words, the side vertical inflatable cell 37 corresponds to a position that extends from the intermediate vertical inflatable cell 38 and straddles the headrest 14R, and the side vertical inflatable cell 40 corresponds to a position that extends from the intermediate vertical inflatable cell 39 and straddles the headrest 14L.

In the airbag 33, a portion that is below the lateral inflatable cell 36 and between the side vertical inflatable cell 37 and the intermediate vertical inflatable cell 38 forms a non-inflatable portion 41, which is not supplied with the inflation gas G from the inflator 31. The non-inflatable portion 41 is formed solely by the fabric sheet 34B at the backside (the rear side of the vehicle). The position of the non-inflatable portion 41 in the airbag 33 is the position corresponding to the space behind the headrest 14R when the airbag 33 is deployed and inflated. The non-inflatable portion 41 serves mainly to receive flying objects entering the inside of the vehicle 10 from behind the vehicle 10. The non-inflatable portion 41 has a displacement permitting portion that permits outward displacement of the side vertical inflatable cell 37 in the direction of the width of the vehicle. The displacement permitting portion is configured by a slit 43 extending from a distal edge 42 of the non-inflatable portion 41 toward the proximal portion 33A of the airbag 33. An upper end 43U of the slit 43 is located at the upper end of the non-inflatable portion 41 (the boundary portion between the non-inflatable portion 41 and the lateral inflatable cell 36). The slit 43 divides the non-inflatable portion 41 to a first divided portion 44$i$ and a second divided portion 44$o$ in the direction of the width of the vehicle. The first divided portion 44$i$ is located closer to the intermediate vertical inflatable cell 38, or the interior of the vehicle. The second divided portion 44$o$ is located closer to the side vertical inflatable cell 37, or the exterior of the vehicle.

Likewise, In the airbag 33, a portion that is below the lateral inflatable cell 36 and between the intermediate vertical inflatable cell 39 and the side vertical inflatable cell 40 forms a second non-inflatable portion 45, which is not supplied with the inflation gas G from the inflator 31. The non-inflatable portion 45 is formed solely by the fabric sheet 34B at the backside. The position of the non-inflatable portion 45 in the airbag 33 is the position corresponding to the space behind the headrest 14L when the airbag 33 is deployed and inflated. The non-inflatable portion 45 serves mainly to receive flying objects entering the inside of the vehicle 10 from behind the vehicle 10. The non-inflatable portion 45 has a displacement permitting portion that permits outward displacement of the side vertical inflatable cell 40 in the direction of the width of the vehicle. The displacement permitting portion is configured by a slit 47 extending from a distal edge 46 of the non-inflatable portion 45 toward the proximal portion 33A of the airbag 33. An upper end 47U of the slit 47 is located at the upper end of the non-inflatable portion 45 (the boundary portion between the non-inflatable portion 45 and the lateral inflatable cell 36). The slit 47 divides the non-inflatable portion 45 to a third divided portion 48$i$ and a fourth divided portion 48$o$ in the direction of the width of the vehicle. The third divided portion 48$i$ is located closer to the intermediate vertical inflatable cell 39, or the interior of the vehicle. The fourth divided portion 48$o$ is located closer to the side vertical inflatable cell 40, or the exterior of the vehicle.

An inner tube 51 is provided in the airbag 33 to guide the inflation gas G from the inflator 31 to flow in specific directions. Like the airbag 33, the inner tube 51 is formed by sewing one or two woven fabric sheets.

The inner tube 51 has an inlet portion 53 located in the gas supply portion 35 of the airbag 33, and a guide portion 54 located in the lateral inflatable cell 36 of the airbag 33. An end of the inlet portion 53 that corresponds to the supply port 35A of the gas supply portion 35 is open. Through this opening, the inflator 31 is inserted into the inlet portion 53. The gas supply portion 35 and the inlet portion 53 are hermetically fastened to the inflator 31 by an annular fastener (not shown) attached from the outside.

The guide portion 54 extends straight along the vehicle width direction. The guide portion 54 communicates with the inlet portion 53 at a center in the vehicle width direction. An outlet port 55 is formed at each of both ends of the guide portion 54 in the vehicle width direction. A pair of outlet holes 56, which have a smaller opening area than that of the outlet port 55, are formed at positions below the center of the guide portion 54 in the vehicle width direction. The outlet holes 56 are located above the intermediate vertical inflatable cells 38, 39.

FIGS. 8(A) and 8(B) each show the relationship between the position of the airbag 33 folded in the aforementioned accommodated form and the positions of the left and right rear pillar garnishes 16. More specifically, FIG. 8(A) is a front view showing the airbag 33, and FIG. 8(B) shows the airbag 33 accommodated in the accommodation portion 32, together with the rear pillar garnishes 16 and the rear roof headlining 23, as viewed from front of the vehicle. In FIGS. 8(A) and 8(B), corresponding positions are connected together by alternate long and short dash lines.

When held in the accommodated form, the airbag 33 forms an elongated shape extending along the direction of the width of the vehicle. Folded and layered portions 61 are formed at both lateral ends of the airbag 33. This shortens the length L of the airbag 33 in the direction of the width of the vehicle.

The accommodated form is brought about by folding the spread airbag 33 in the following manner.

First, the airbag 33 in the spread state, as illustrated in FIG. 7(A), is folded starting from the edges 42, 46 toward the proximal portion 33A sequentially along the fold lines 62A to 62H in one direction. This provides a volute portion 63 having a substantially volute cross section (see FIGS. 5(A) and 5(B)). Folding of the airbag 33 ends at the fold line 62H. The folding direction is opposite to a main deploying direction (a substantially downward direction) of the airbag 33. Through such folding, the left and right non-inflatable portions 45, 41, in addition to the two side vertical inflatable cells 37, 40 and the intermediate vertical inflatable cells 38, 39, are formed in volute shapes. As a result, the volute portion 63 (see FIGS. 5(A) and 5(B)) is provided at the position spaced from the proximal portion 33A toward the edges 42, 46 by a predetermined distance. The edges 42, 46 of the airbag 33 are thus brought closer to the proximal portion 33A.

Subsequently, the airbag 33 is folded in a bellows-like shape along the fold line 62I in the direction opposite to the folding direction along the fold lines 62A to 62H. This provides a bellows portion 64 (see FIGS. 5(A) and 5(B)) between the proximal portion 33A and the volute portion 63 in the airbag 33. In this manner, the airbag 33 is folded to form the volute portion 63 and the bellows portion 64. As a result, an intermediate body 65 shown in FIG. 7(B) is formed.

Due to the difference in the folding manner, the inflation gas G more easily flows into the bellows portion 64, than into the volute portion 63. Further, when the rear roof headlining 23 is inclined downward, the volute portion 63 may easily fall down along the rear roof headlining 23. This facilitates deploying of the airbag 33 along the rear window 27.

Alternatively, the airbag 33 may be folded in forms other than those described above. For example, the airbag 33 may be folded in a bellows-like form entirely.

The length L of the folded intermediate body 65 along the vehicle width direction is the maximum possible length, and is equal to the maximum width W of the airbag 33 along the vehicle width direction shown in FIG. 6. Since the length L is greater than the distance D between the upper ends 16A of the rear pillar garnish 16 (refer to FIG. 8), it is impossible to accommodate the folded intermediate body 65 in the accommodation portion 32, which has the same width as the dimension of the distance D, as it is.

Thus, as shown in FIG. 8(B), both ends 69 of the folded intermediate body 65 in the vehicle width direction (refer to FIG. 7(B)) are folded and layered to form folded and layered portions 61. The length L along the vehicle width direction of the airbag 33, which has been folded into the shape for accommodation, is slightly less than the dimension of the distance D between the upper ends 16A of the rear pillar garnish 16, and thus can be accommodated in the accommodation portion 32. Each folded and layered portion 61 includes three layers, or an upper layer 66, a middle layer 67, and a lower layer 68, which are formed by folding both ends 69 in a bellows like manner multiple times (twice). The layers 66 to 68 are stacked together in this order from upside to downside.

The procedure for forming the folded and layered portions 61 will now be described. First, the folded intermediate body 65 is folded at a valley fold line 71 and a mountain fold line 72 defined in each end 69 shown in FIG. 7(B). Either the valley fold or the mountain fold may be performed first. The valley fold lines 71 and the mountain fold lines 72 extend perpendicularly to the longitudinal direction of the folded intermediate body 65. In each end 69 of the folded intermediate body 65, the mountain fold line 72 is located inside of the valley fold line 71. The folded and layered portions 61 are axisymmetrical with respect to a centerline in the vehicle width direction. As a result, with reference to FIGS. 8(A) and 8(B), the folded and layered portions 61 are formed at both ends 69 of the intermediate body 65 in the direction of the width of the vehicle. The airbag 33 is thus arranged in the accommodated form.

The form of each folded and layered portion 61 of the intermediate body 65 may be modified as needed. For example, the folded and layered portion 61 may be provided only in one of the ends 69 of the folded intermediate body 65, and the folded and layered portion 61 in the other end 69 may be omitted. Alternatively, folded and layered portions may be provided in portions of the folded intermediate body 65 other than the ends 69. Further, instead of folding the ends 69 of the folded intermediate body 65 in a bellows like manner, the folded and layered portions 61 may be formed to have volute cross sections. Also, the number of folds of each folded and layered portion 61 may be changed.

The folded and layered portions 61 do not necessarily need to be axisymmetrical with respect to the centerline in the vehicle width direction.

After folded into the shape for accommodation as described above, the airbag 33 is bound by using, for example, binding tape at positions that include at least positions corresponding to the folded and layered portions 61.

Then, the airbag 33 is placed in the accommodation portion 32 in such a manner that the folded and layered portions 61 are located downward. Further, the two ends of the airbag 33 are located in the vicinity of the upper ends 16A at the positions inward of the rear pillar garnishes 16.

To fix the airbag 33, the following configuration is employed.

As illustrated in FIG. 6, an attachment portion 81 extending from the proximal portion 33A of the airbag 33 is provided beside and in the vicinity of the gas supply portion 35. Accordingly, when the airbag 33 is folded in the elongated shape, the attachment portion 81 is located rearward of the proximal portion 33A of the airbag 33 in the deploying direction. The attachment portion 81 is fastened to the inner panel 24 through a fastening tool 82 at a position rearward of the inflator 31 in the vehicle (see FIG. 5(A)).

A pair of attachment portions 83, each extending from the proximal portion 33A, are provided at the two side portions of the airbag 33 in the direction of the width of the vehicle. Although the attachment portions 83 are formed integrally with the airbag 33 herein, the attachment portions 83 may be formed by independent members from the airbag 33. The airbag 33 in the accommodated form, which is folded and layered in the above-described manner, is attached to the inner panel 24 through fastening tools 84 such as bolts, at the two attachment portions 83 (see FIG. 8(B)), while maintained in states tensioned toward both outer sides in the longitudinal direction of the airbag 33 (the direction of the width of the vehicle).

The airbag apparatus includes a sensor 91 and a controller 92 as shown in FIGS. 1 and 2. The sensor 91 is provided in a rear portion of the vehicle 10, which is, for example, a rear bumper 93, and detects impact on the vehicle 10 from behind. The controller 92 controls the operation of the inflator 31 based on a detection signal from the sensor 91.

The airbag apparatus according to the first embodiment of the invention is configured as has been described. When the airbag apparatus is not in operation, the airbag 33 is accommodated in the accommodation portion 32, which is arranged in the rear end portion of the roof 21 of the vehicle 10, in the accommodated form.

The operation of the airbag apparatus will now be described.

When the sensor 91 detects that a rear impact, the magnitude of which is greater than or equal to a predetermined value, is applied to the vehicle 10, the controller 92 outputs a drive current to the inflator 31. The gas generating agent in the inflator 31 is reacted by the drive current, which generates inflation gas G.

The inflation gas G generated in the inflator 31 is first supplied to the inlet portion 53 of the inner tube 51 as shown by arrows in FIG. 6. As the inlet portion 53 is inflated by the supplied inflation gas G, the gas supply portion 35 of the airbag 33, which is located outside of the inlet portion 53, is also inflated.

The inflation gas G flows into the center of the guide portion 54 through the inlet portion 53. The pressure produced by the inflation gas G causes the different portions (in this case, the guide portion 54 and the lateral inflatable cell 36) of the airbag 33 to start inflating. This generates the force acting to unfold and flatten the fold lines. However, the two folded and layered portions 61 act to prevent inflation of the airbag 33 in a rearward and diagonally downward direction. As a result, the airbag 33 held in the accommodated form deploys and inflates in the following manner.

Some of the inflation gas G that has entered the inner tube 51 from the inlet portion 53 flows to the two outer sides in the direction of the width of the vehicle, or in mutually opposite directions in the direction of the width of the vehicle, substantially evenly. As a result, the pressure of the inflation gas G is applied to the two outer sides in the direction of the width of the vehicle from the center. This causes the inner tube 51 and the lateral inflatable cell 36 to inflate in the direction of the width of the vehicle. This eventually tears the binding tape that binds the airbag 33 together. As the lateral inflatable cell 36 is inflated, the airbag 33 presses rear portions of the rear roof headlining 23 (refer to FIG. 5) downward.

Figure 9:
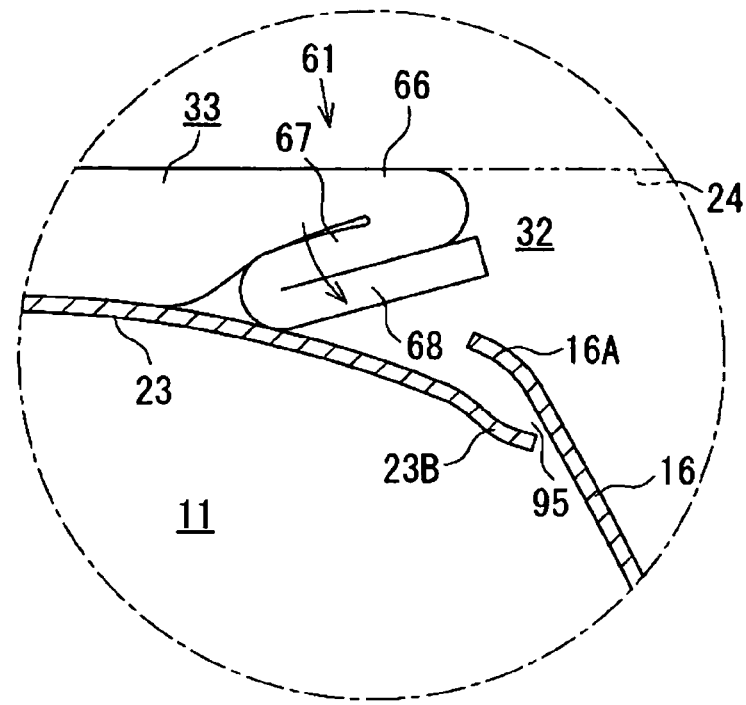
FIGS. 9 and 10 are diagrammatic views showing the operation of the folded and layered portion of the airbag during the inflation and deployment.

Some of the inflation gas G supplied to the guide portion 54 flows into the lateral inflatable cell 36 through the outlet ports 55. As gas flows into the lateral inflatable cell 36, the folded and layered portions 61 are unfolded. At this time, gas flows into the upper layer 66 as shown in FIG. 9 in each folded and layered portions 61. As a result, the middle layer 67 and the lower layer 68 are pressed downward and displaced to trace a path along a downward arc about the fold line 72 (FIG. 7) between the upper layer 66 and the middle layer 67. In this process, the binding tape binding the folded and layered portions 61 are eventually broken.

When the middle layer 67 and the lower layer 68 of the folded and layered portions 61 are displaced to trace an arcuate path, the left and right edges 23B of the rear roof headlining 23 are pressed downward. As a result, the head lining edges 23B of the rear roof headlining 23 are flexed downward. Eventually, as shown in FIG. 9, each edge 23B of the rear roof headlining 23 gets over the upper end 16A of the corresponding rear pillar garnish 16, so that the edge 23B is located below the upper end 16A of the rear pillar garnish 16.

Figure 10:
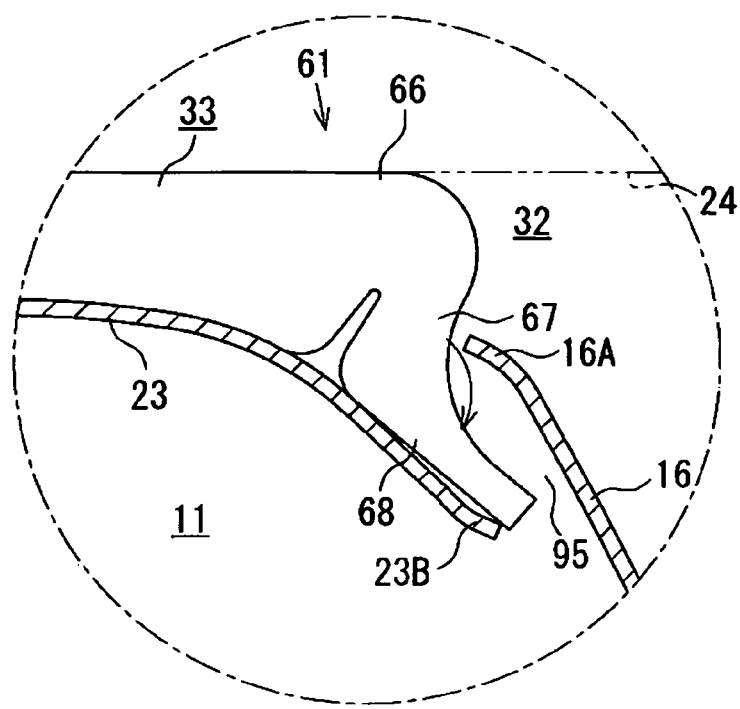
Figure 11:
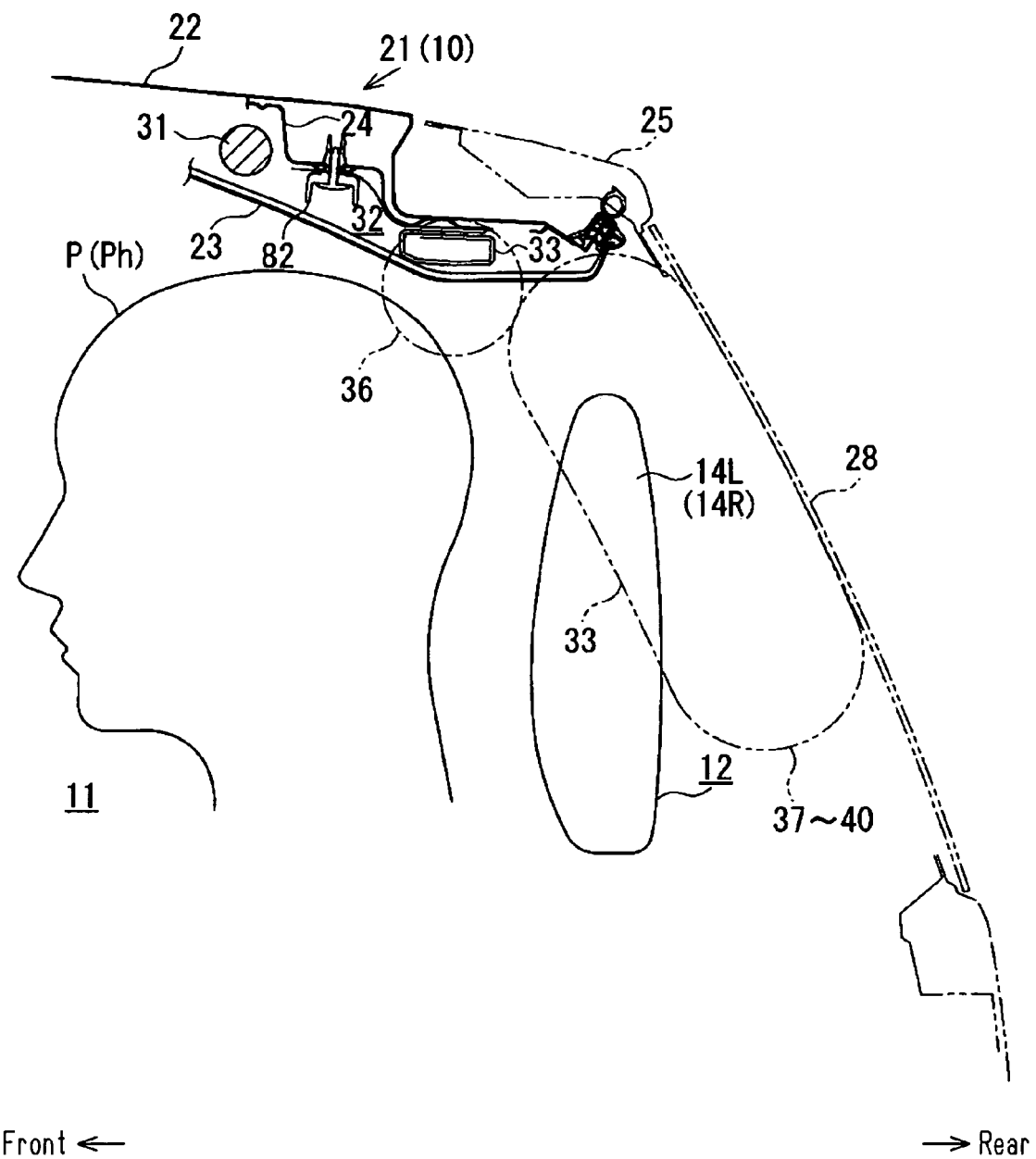
FIG. 11 is a cross-sectional side view showing the airbag that is deployed and inflated downward and diagonally rearward from the accommodation portion.

Further, gas flowing to the middle layer 67 of each folded and layered portion 61 applies a downward pressure to the lower layer 68. As a result, as shown in FIG. 10, the lower layer 68 is displaced to trace a path of a downward arc about the fold line 71 (FIG. 7) between the middle layer 67 and the lower layer 68. In this process, a gap 95 is created between the edge 23B of the rear roof headlining 23 and the upper end 16A of the rear pillar garnish 16. The gap 95 is increased as unfolding of the folded and layered portion 61 progresses. When unfolded, the folded and layered portions 61 extend into the space below the rear roof headlining 23 through the gap 95.

Afterwards, by receiving the inflation gas G, the folded and layered portions 61 continuously extend outward in the direction of the width of the vehicle and deploy downward, while unfolding the fold lines.

When the folded and layered portions 61 deploy, the two side vertical inflatable cells 37, 40 deploy and inflate. In other words, in each of the folded and layered portions 61, the inflation gas G is introduced into the lateral inflatable cell 36 and the side vertical inflatable cells 37, 40 in this order, when the middle layer 67 and the lower layer 68 are sequentially displaced along arcuate paths. The inflation gas G is sent outward in the direction of the width of the vehicle in the lateral inflatable cell 36. In the side vertical inflatable cells 37, 40, the inflation gas G is sent diagonally outward and downward.

As has been described, the folded and layered portions 61 at both sides are folded and layered in such a manner as to form axisymmetrical portions about the axis of the airbag 33 in the proceeding direction of the vehicle. That is, the folded and layered portions 61 are bilaterally symmetrical. As a result, the folded and layered portions 61 at both sides deploy substantially at the same timing while forming arcuate paths in mutually opposite directions.

As the unfolding of the folded and layered portions 61 progresses, the folded portions at the fold line 62I on the lateral inflatable cell 36 are eventually unfolded. As a result, the gas in the inner tube 51 flows out not only through the outlet ports 55, but also through the outlet holes 56 provided in the lower portion of the guide portion 54. After the inflation gas G fully unfolds and flattens the fold lines of the bellows portion 64, the guide portion 54 of the inner tube 51 and the lateral inflatable cell 36 inflate in cylindrical shapes (as indicated by the alternate long and two short dashes lines in FIG. 11).

Some of the inflation gas G that has flowed in through the outlet holes 56 and some of the inflation gas G that has flowed out through the two outlet ports 55 flow downward into the intermediate vertical inflatable cell 38 and the intermediate vertical inflatable cell 39, respectively. The pressure of the inflation gas G increases the force that acts on the airbag 33 in a rearward and diagonally downward direction, in addition to outward directions in the direction of the width of the vehicle. In this manner, the inflation gas G that has been sent out from the inner tube 51 starts to flow into the two side vertical inflatable cells 37, 40 and the intermediate vertical inflatable cells 38, 39 in addition to the lateral inflatable cell 36. The inflation gas G, in the airbag 33, thus causes the bellows portion 64 and the volute portion 63 to start inflating in rearward and diagonally downward directions, simultaneously with the folded and layered portions 61 that deploy outward in the direction of the width of the vehicle.

As the unfolding of the bellows portion 64 and the volute portion 63 progresses, the downward force applied to the rear roof headlining 23 by the airbag 33 increases as shown in FIG. 5. As the pressing force continuously increases, the pressing force exceeds the force that acts to maintain engagement between the roof panel 22 and the rear roof headlining 23 through the engaging pieces 29A. Eventually, the engagement between the roof panel 22 and the rear roof headlining 23 by the engaging pieces 29A is cancelled, and the rear roof headlining 23 is flexed downward as shown by alternate long and two short dashes lines in FIG. 5. As a result, an opening 96 is formed between the rear end 23A of the rear roof headlining 23 and the inner panel 24.

As the rear portion of the rear roof headlining 23 is continuously pressed downward, the opening 96 becomes enlarged. After the bellows portion 64 and the volute portion 63 deploy, the airbag 33 extends downward through the opening 96. Specifically, the airbag 33 deploys and inflates along the rear window glass 28, as indicated by the alternate long and two short dashes lines in FIG. 11, in such a manner as to isolate the rear seat 12 from the rear window glass 28.

As has been described, the airbag 33 deploys while unfolding and flattening the fold lines in the rearward and diagonally downward direction in addition to the outward directions in the direction of the width of the vehicle. Specifically, while the lateral inflatable cell 36 extends outward in the direction of the width of the vehicle, the two side vertical inflatable cells 37, 40, the intermediate vertical inflatable cells 38, 39, and the non-inflatable portions 41, 45 deploy rearward and diagonally downward.

Deploying and inflating operation of the two side vertical inflatable cells 37, 40, the intermediate vertical inflatable cells 38, 39, and the non-inflatable portions 41, 45 will hereafter be described in further detail.

Figure 12:
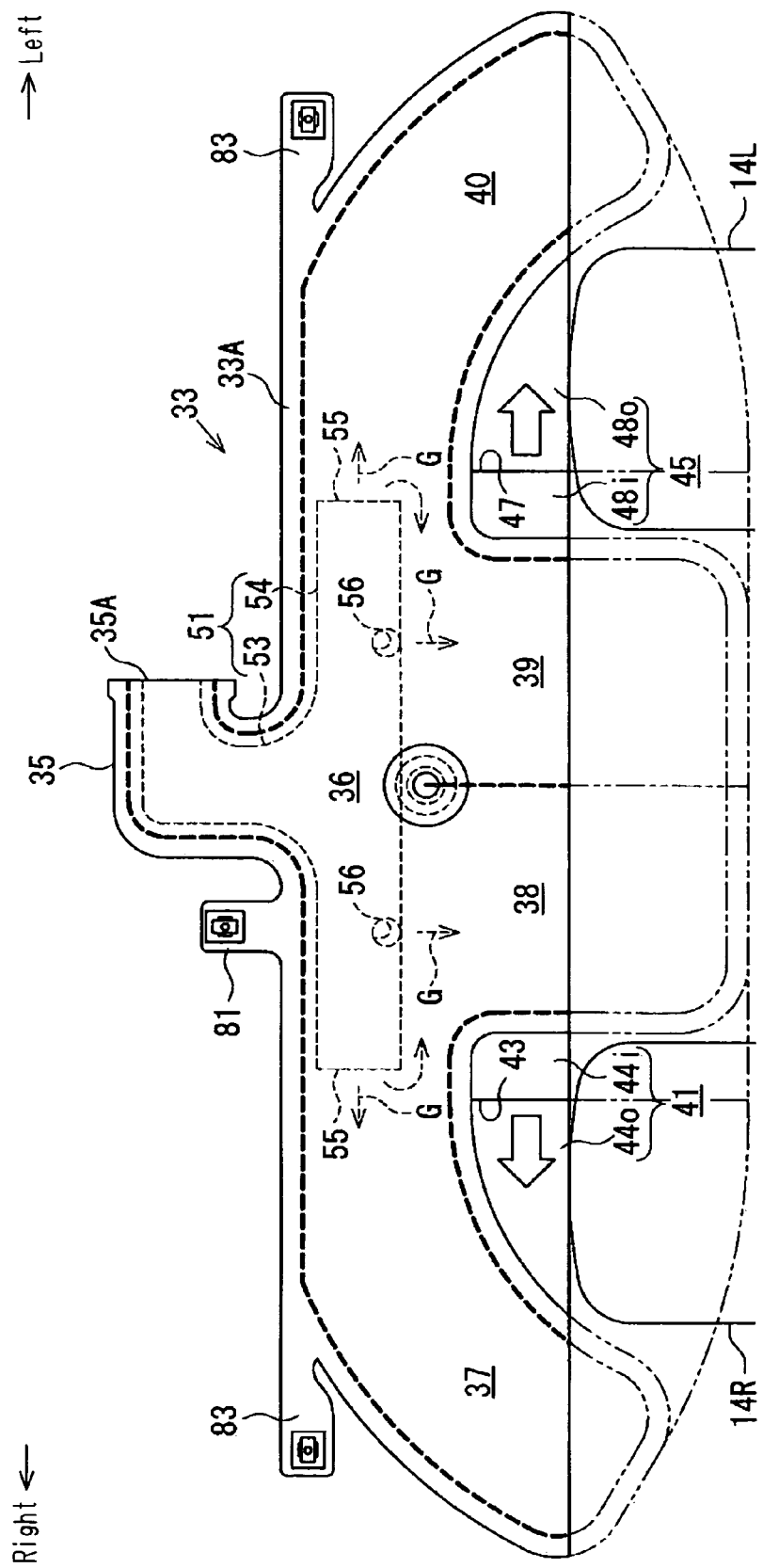
FIG. 12 is a front view showing the non-inflatable portion of the airbag in a state deployed beyond the headrest.

As shown in FIG. 12, the side vertical inflatable cells 37, 40 deploy and inflate substantially downward from positions higher than the headrests 14L, 14R along paths outward of the headrests 14L, 14R. More accurately, the side vertical inflatable cells 37, 40 deploy and inflate rearward and diagonally downward each at a position between the space without the headrest 14L, 14R and the rear window glass 28. In addition, as the side vertical inflatable cells 37, 40 extend downward, the side vertical inflatable cells 37, 40 deploy and inflate diagonally outward and downward in such a manner as to become more spaced outward from the intermediate vertical inflatable cells 38, 39 in the direction of the width of the vehicle.

The intermediate vertical inflatable cells 38, 39 deploy and inflate downward from positions higher than the headrests 14L, 14R along paths located inward of the headrests 14L, 14R. In other words, the two intermediate vertical inflatable cells 38, 39 deploy and inflate each in the space without the headrest 14L, 14R, or the space between the two headrests 14L, 14R, and above the rear seat 12. Deployment and inflation of the intermediate vertical inflatable cells 38, 39 in the vehicle proceeding direction occurs at positions between the space between the headrests 14L, 14R and the rear window glass 28.

Deployment and inflation of the two side vertical inflatable cells 37, 40 and deployment and inflation of the intermediate vertical inflatable cells 38, 39, which have been described above, happen substantially at the same timing.

Operation of the non-inflatable portions 41, 45 and operation of the slits 43, 47 will now be described.

The non-inflatable portion 41, which is formed by the fabric that connects the right side vertical inflatable cell 37 and the intermediate vertical inflatable cell 38 to each other, does not receive the inflation gas G and thus does not inflate. The non-inflatable portion 41 is designed originally to extend beyond the headrest 14R, which is located forward in the deploying direction of the non-inflatable portion 41, and deploy behind the headrest 14R.

Generally, as has been described in the section of the background art, such non-inflatable portion receives tension acting outward in the direction of the width of the vehicle. In this case, the non-inflatable portion may be caught by a corner of the corresponding headrest. This restricts the movement of the side vertical inflatable cell outward in the direction of the width of the vehicle. As a result, the force of the two vertical inflatable cells acting to deploy and inflate rearward decreases and thus becomes lower than the force of the vertical inflatable cells acting to deploy downward. This hampers further deployment of the corresponding non-inflatable portions, making it difficult for each non-inflatable portion to extend beyond the corresponding headrest and deploy behind the headrest. Correspondingly, the two vertical inflatable cells connected to the non-inflatable portions are also prevented from deploying and inflating.

However, in the airbag apparatus according to the first embodiment of the present invention, the slit 43 is provided in the non-inflatable portion 41 as the displacement permitting portion. In the non-inflatable portion 41, the first and second divided portions 44i, 44o, which are arranged adjacent to each other at both sides of the slit 43, are independent from each other. This arrangement makes it difficult for the non-inflatable portion 41 to restrict outward displacement of the side vertical inflatable cell 37 in the direction of the width of the vehicle. Even if the non-inflatable portion 41 contacts the headrest 14R, the side vertical inflatable cell 37 displaces outward in the direction of the width of the vehicle. As a result, the force of the side vertical inflatable cell 37 acting to deploy and inflate rearward is continuously maintained greater than the force of the side vertical inflatable cell 37 acting to deploy downward. Accordingly, even if the non-inflatable portion 41 contacts the headrest 14R while deploying, the non-inflatable portion 41 is allowed to extend beyond the headrest 14R without being caught by the headrest 14R. Afterwards, the non-inflatable portion 41 continuously deploys behind the headrest 14R in a smooth manner until it reaches a predetermined position while unfolding and flattening the fold lines.

The left non-inflatable portion 45 operates in the same manner as the non-inflatable portion 41, which has been described above, with respect to the headrest 14L. Even if the non-inflatable portion 45 contacts the headrest 14L while deploying, the non-inflatable portion 45 is allowed to extend beyond the headrest 14L without being caught by the headrest 14L. Afterwards, the non-inflatable portion 45 continuously deploys behind the headrest 14L in a smooth manner until it reaches a predetermined position while unfolding and flattening the fold lines.

As has been described, the non-inflatable portions 41, 45 both deploy smoothly without being caught by the corresponding headrests 14R, 14L. Accordingly, the side vertical inflatable cells 37, 40 deploy and inflate substantially downward from positions higher than the corresponding headrests 14R, 14L along the paths outward of the headrests 14R, 14L. At this stage, the side vertical inflatable cells 37, 40 deploy and inflate rearward and diagonally downward in such a manner that, as the side vertical inflatable cells 37, 40 extend downward, the side vertical inflatable cells 37, 40 become more spaced rearward from the headrest 14R, 14L in the vehicle proceeding direction. Also, the side vertical inflatable cells 37, 40 deploy and inflate rearward and diagonally downward in such a manner that, as the side vertical inflatable cells 37, 40 extend downward, the side vertical inflatable cells 37, 40 become more spaced outward from the headrest 14R, 14L in the direction of the width of the vehicle.

The intermediate vertical inflatable cells 38, 39 deploy and inflate substantially downward from positions higher than the corresponding headrests 14R, 14L along the paths located inward of the headrests 14R, 14L. At this stage, the intermediate vertical inflatable cells 38, 39 deploy and inflate rearward and diagonally downward in such a manner that, as the intermediate vertical inflatable cells 38, 39 extend downward, the intermediate vertical inflatable cells 38, 39 become more spaced rearward from the headrest 14R, 14L in the vehicle proceeding direction.

After the airbag 33 is enlarged and reaches the lowermost position that the airbag 33 can reach, the airbag 33 is in a fully deployed state. In this state, the airbag 33 has a trapezoidal shape substantially identical to the shape defined by the left and right rear pillar garnishes 16. The airbag 33 covers a substantial entire range of the rear window glass 28.

When the airbag 33 is deployed as has been described, the head Ph of the occupant P seated on the rear seat 12 and the rear window glass 28 are isolated from each other by the airbag 33 (as indicated by the corresponding alternate long and two short dashes lines in FIG. 1). As a result, the inflatable cells 36 to 40, which are deployed and inflated, and the non-inflatable portions 41, 45, which are deployed, absorb the impact applied to the rear of the vehicle 10. Further, the influence on the occupant P by flying objects entering the passenger compartment 11 from behind is reduced. Also, change of the posture of the occupant P in a rearward direction is suppressed.

The first embodiment as described above has the following advantages. The advantages obtained by the right non-inflatable portion 41 are ensured equally by the left non-inflatable portion 45. Accordingly, only the right non-inflatable portion 41 will be described in the following.

(1) The slit 43 is provided in the right non-inflatable portion 41 as the displacement permitting portion. The slit 43 thus permits outward displacement of the side vertical inflatable cell 37 in the direction of the width of the vehicle. The non-inflatable portion 41 is thus prevented from being caught by the headrest 14R and interfere with the headrest 14R while deploying. Accordingly, the non-inflatable portion 41 is allowed to deploy smoothly until it reaches the predetermined position behind the headrest 14R. Correspondingly, the side vertical inflatable cells 37, 38, which are located at both sides of the non-inflatable portion 41, are allowed to deploy and inflate reliably until they reach the predetermined positions in the vicinity of lateral sides of the headrest 14R.

The advantage is ensured regardless of the position of the accommodation portion 32 with respect to the headrest 14R, 14L in the vehicle proceeding direction. As a result, the airbag apparatus according to the first embodiment is effectively employed not only in the vehicle 10 in which the accommodation portion 32 is arranged in the rear portion of the space over the ceiling of the passenger compartment, but also the vehicle 10 in which the accommodation portion 32 is located forward of the rear portion of the space over the ceiling of the passenger compartment.

(2) The slit 43, which extends from the edge 42 of the right non-inflatable portion 41 to the proximal portion 33A of the airbag 33, is provided for the non-inflatable portion 41. This divides the non-inflatable portion 41 into the divided portions 44i, 44o in the direction of the width of the vehicle so that the non-inflatable portion 41 is held in a loose state. The side vertical inflatable cell 37 is thus allowed to displace outward in the direction of the width of the vehicle and the advantage (1) is reliably obtained.

The displacement permitting portion, which permits outward displacement of the side vertical inflatable cell 37 in the direction of the width of the vehicle, can be embodied in various forms. In the first embodiment, the displacement permitting portion is provided as the slit 43, which is an extremely simple structure. The slit 43 is formed only by cutting the non-inflatable portion 41, which is simple work.

The portion of the non-inflatable portion 41 located outward of the slit 43 in the direction of the width of the vehicle (the second divided portion 44o) and the portion of the non-inflatable portion 41 located inward of the slit 43 in the direction of the width of the vehicle (the first divided portion 44i) are separated from each other but arranged close to each other. Both portions are located behind the headrest 14R. This configuration also ensures the advantage of receiving flying objects entering the vehicle 10 from behind.

Figure 13:
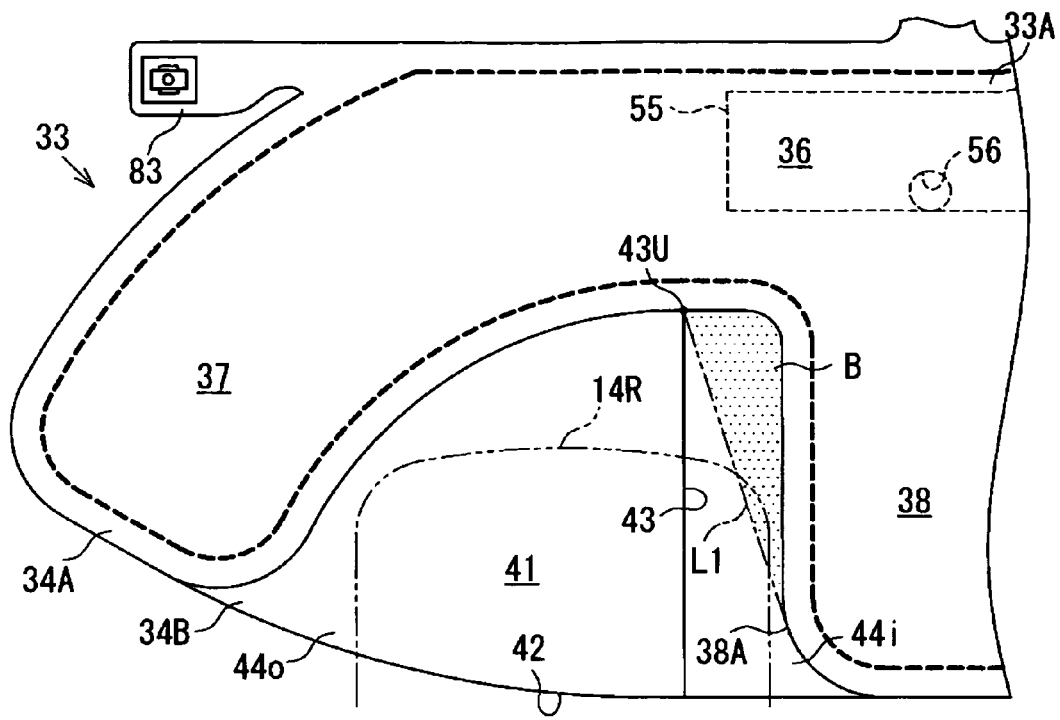
FIG. 13 is a front view showing a portion of the airbag, with reference to which operation of a slit provided close to an intermediate vertical inflating cell is explained.

(3) As illustrated in FIG. 13, by defining the slit 43 in the non-inflatable portion 41, the first and second divided portions 44i, 44o are formed at both sides of the slit 43 in the direction of the width of the vehicle. Basically, the first and second divided portions 44i, 44o are constantly held in loose states, thus permitting outward displacement of the side vertical inflatable cell 37 in the direction of the width of the vehicle.

However, in a strict sense, a particular portion B of the first divided portion 44i is held in a tense state for a reason involved in the structure of the portion B. The particular portion B is the portion surrounded by the outer edge of the intermediate vertical inflatable cell 38 and the alternate long and short dash line L1. The alternate long and short dash line L1 is defined by connecting the boundary 38A between the intermediate vertical inflatable cell 38 and the first divided portion 44i in the vicinity of the distal end of the intermediate vertical inflatable cell 38 to the upper end 43U of the slit 43. Specifically, the intermediate vertical inflatable cell 38 has high rigidity when inflated compared to the side vertical inflatable cell 37. The particular portion B is thus constantly maintained in the tense state. In the portion B, which is tense, the effect of permitting the displacement of the non-inflatable portion 41, which is ensured by the non-inflatable portion 41 in a loose state, cannot be easily obtained.

Accordingly, to reduce the size of the particular portion B held in the tense state, the slit 43 is preferably provided in the vicinity of the intermediate vertical inflatable cell 38 in the non-inflatable portion 41. In this manner, the effect of permitting the displacement of the side vertical inflatable cell 37, which is provided by the non-inflatable portion 41 in a loose state, is further easily obtained.

(4) Japanese Laid-Open Patent Publication No. 2007-261512 describes a rear airbag apparatus related to the present invention. In this apparatus, a recess extending from a distal edge of an airbag, which is located forward in a deploying direction, toward a proximal portion of the airbag, is provided in a portion of the airbag located behind each headrest. However, the portion of the airbag behind the headrest is not a non-inflatable portion but an inflatable portion. In other words, the airbag apparatus described in the aforementioned document is configured without a non-inflatable portion. Accordingly, the apparatus is free from the disadvantage caused by the non-inflatable portion that the non-inflatable portion may be caught by the headrest. Further, the recess cannot provide the effect of suppressing interference between the non-inflatable portion and the headrest. Specifically, the recess is aimed to suppress interference between a strap, which restricts downward movement of a rear end portion of a roof headlining, and the airbag.

Other embodiments of the invention will be described in the following mainly about the differences between these embodiments and the first embodiment. Same or like reference numerals are given to components of the following embodiments that are the same as or like corresponding components of the first embodiment and explanation thereof will be omitted.

Second Embodiment

An airbag apparatus according to a second embodiment of the present invention will hereafter be described with reference to FIG. 14.

The second embodiment is different from the first embodiment in that a slit 101 and a breakable portion 102 are provided in each of the non-inflatable portions 41, 45 as displacement permitting portions. The displacement permitting portions may be arranged in only one of the non-inflatable portions 41, 45. The displacement permitting portions provided in the non-inflatable portions 41, 45 have common configurations. Accordingly, only the configurations, operations, and advantages of the displacement permitting portions of the right non-inflatable portions 41 will be described in the following and explanation of the left non-inflatable portion 45 will be omitted.

Figure 14:
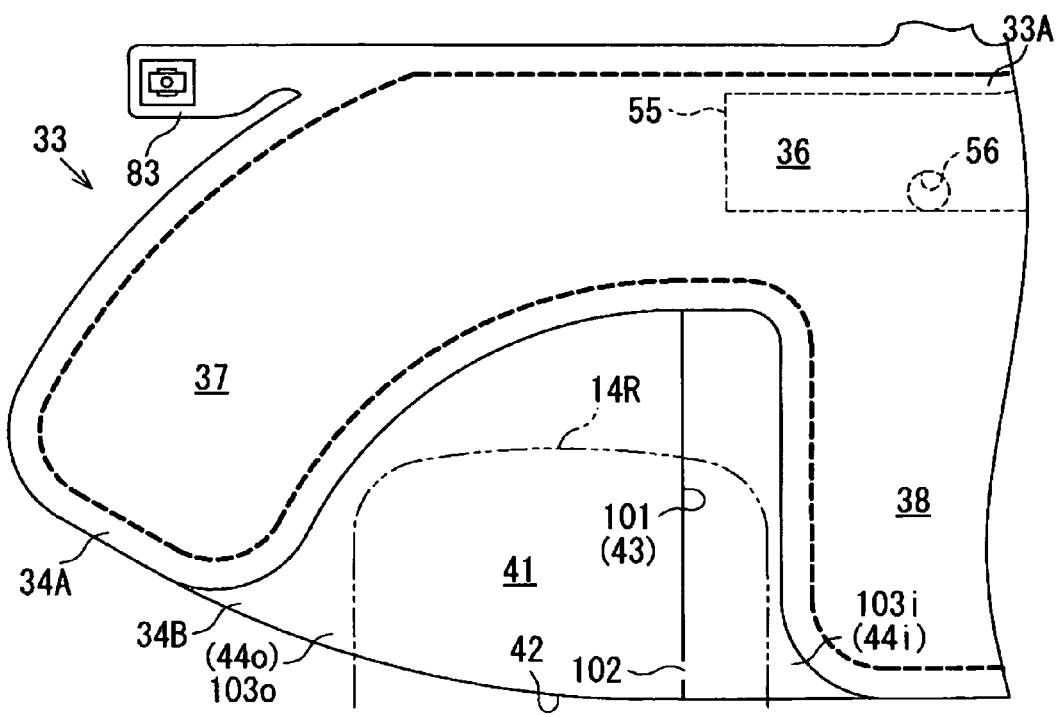
FIG. 14 is a front view showing a portion of an airbag of an airbag apparatus according to a second embodiment of the present invention.

As illustrated in FIG. 14, the slit 101 extends linearly from a position in the vicinity of the distal edge 42 of the non-inflatable portion 41 toward the proximal portion 33A of the airbag 33 breakable portion. The breakable portion 102 is arranged forward of the slit 101 (the lower side as viewed in FIG. 14) in the deploying direction. In the drawing, the breakable portion 102 is provided at a position slightly spaced from the distal edge 42 of the non-inflatable portion 41 toward the proximal portion 33A. However, the breakable portion 102 may be connected to the distal edge 42.

When the airbag 33 is yet to be inflated, portions 103$i$, 103$o$ at both sides of the non-inflatable portion 41 are joined together at the breakable portion 102. Accordingly, by folding one of the portions 103$i$, 103$o$ of the non-inflatable portion 41 at both sides of the slit 43 when folding the airbag 33 in a spread state, the other one of the portions 103$i$, 103$o$ is folded in a following manner. This facilitates the folding of the non-inflatable portion 41.

When the airbag 33 deploys and inflates (particularly, the side vertical inflatable cell 37 and the intermediate vertical inflatable cell 38 deploy and inflate), tension acts on the non-inflatable portion 41 in the direction of the width of the vehicle. In this case, the breakable portion 102 is torn. As a result, the slit 101 extends continuously from the proximal portion 33A of the non-inflatable portion 41 to the distal edge 42. In other words, the slit 101 is switched to the form similar to that of the slit 43 of the first embodiment.

The non-inflatable portion 41 is thus divided into the first and second divided portions 44$i$, 44$o$ by the slit 101 (43) in the direction of the width of the vehicle. Thereafter, interference between the non-inflatable portion 41 and the headrest 14R is suppressed in the same manner as the first embodiment.

Thus, the second embodiment has the following advantage in addition to the advantages (1) to (4) of the first embodiment.

(5) The slit 101 and the breakable portion 102 configure the displacement permitting portion of the non-inflatable portion 41. This facilitates folding of the non-inflatable portion 41 when the accommodated form of the airbag 33 is to be provided, while maintaining the effect of suppressing the interference between the non-inflatable portion 41 and the headrest 14R.

Third Embodiment

Figure 15:
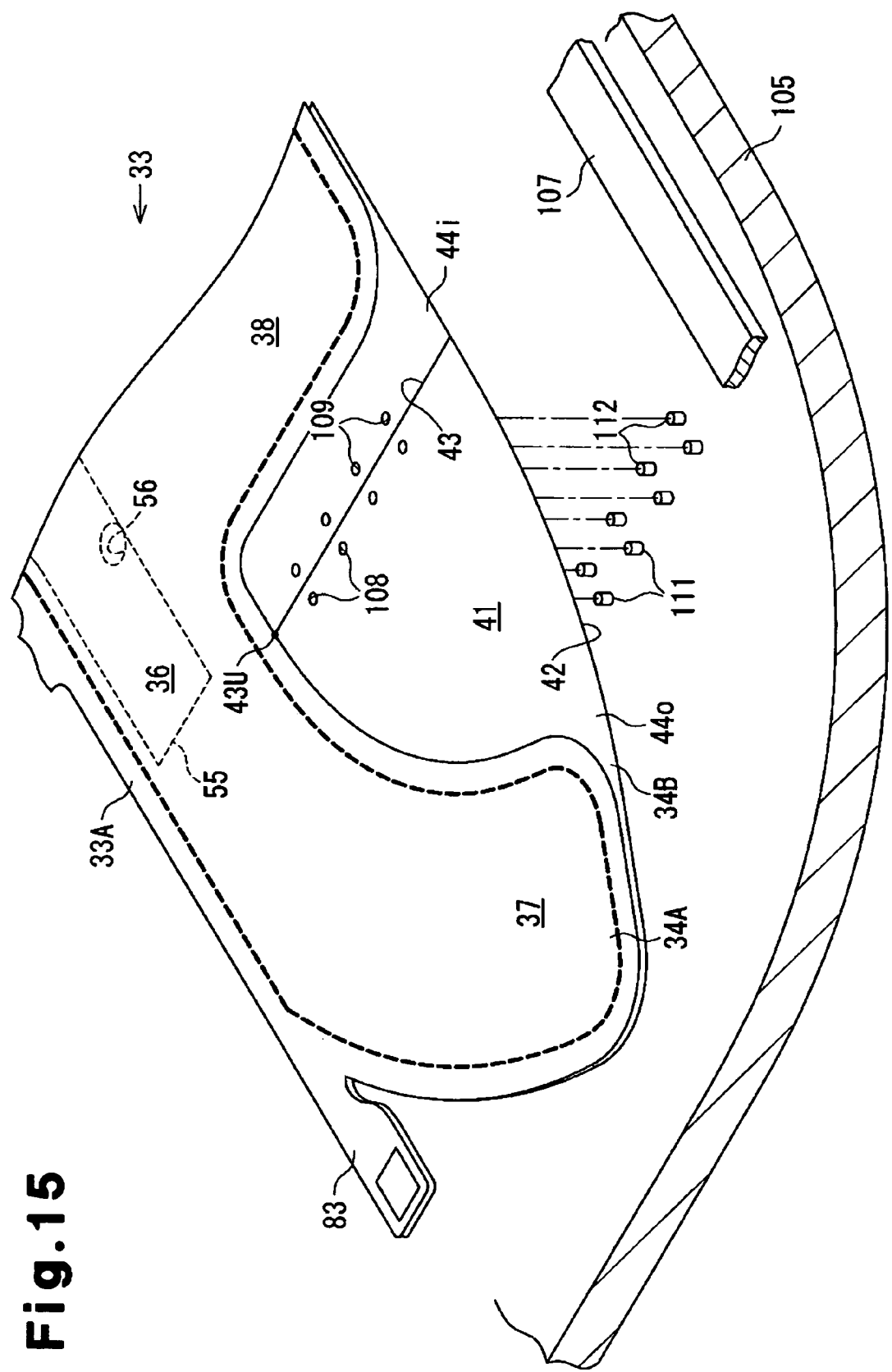
FIG. 15 is a perspective view showing a portion of an airbag apparatus according to a third embodiment of the present invention, representing the relationship among a right non-inflatable portion, a table, and a folding assist tool.
Figure 16:
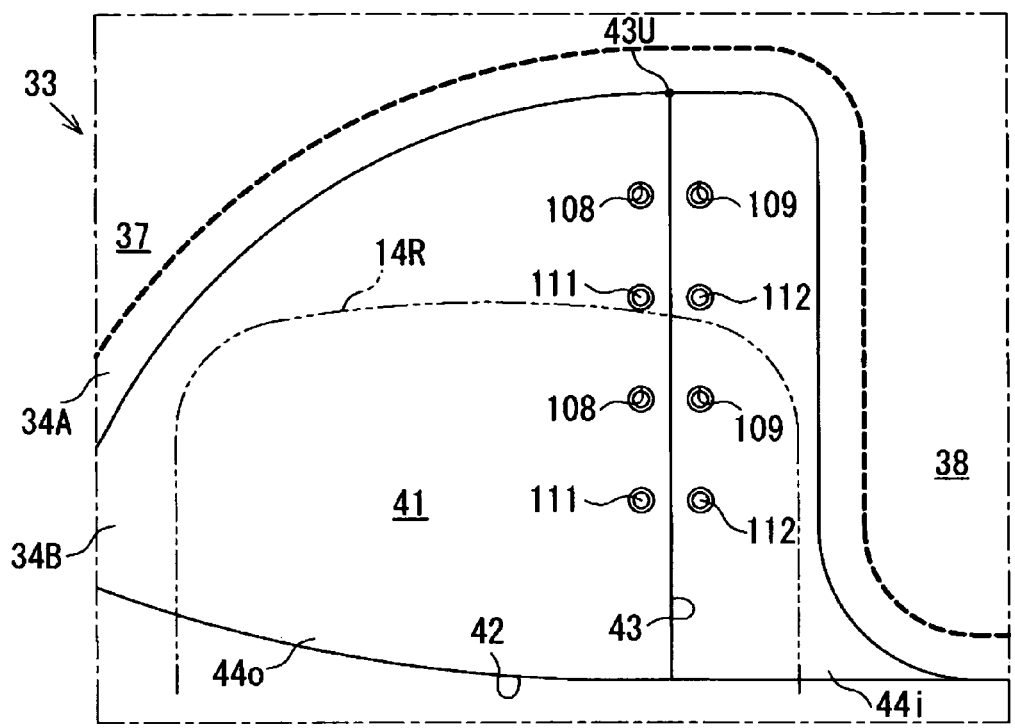
FIG. 16 is a front view showing a portion of the airbag, illustrating the right non-inflatable portion and the pins of FIG. 15.

An airbag apparatus according to a third embodiment of the present invention will hereafter be described with reference to FIGS. 15 and 16.

As has been described about the first embodiment, the airbag 33 in the spread state is folded along the fold lines 62A to 62H in the volute shape when the airbag 33 is folded from the spread state to the state of the intermediate body 65 (see FIGS. 7(A) and 7(B)). Nonetheless, the folding procedure has not been specified in the description of the first embodiment.

Accordingly, the folding procedure will be described. First, the airbag 33 in the deployed state is mounted on a table 105. In the folding procedure, an elongated folding assist tool 107, which extends in the direction of the width of the vehicle, is employed. More specifically, the assist tool 107 is shaped like a thin plate and has a length substantially equal to the width W of the airbag 33 in the deployed state. Using the folding assist tool 107 as a core, the airbag 33 is folded back from the distal edges 42, 46 toward the proximal portion 33A together with the folding assist tool 107. By repeating such folding for a plurality of times, the airbag 33 is folded in the volute shape about the folding assist tool 107, which serves as the core. In this manner, the volute portion 63 is completed.

In the third embodiment, a plurality of engagement portions are provided on the table 105 and a plurality of engaging portions that are engageable with the engagement portions of the table 105 are arranged in the non-inflatable portions 41, 45. The engagement portions of the non-inflatable portions 41, 45 have common configurations. Accordingly, the configuration, operation, and advantages of the engagement portion of only the right non-inflatable portion 41 will be described in the following and explanation of the engagement portion of the left non-inflatable portion 45 will be omitted.

A plurality of engagement holes 108, which are aligned in a line along the slit 43 of the second divided portion 44$o$, are provided in the vicinity of the slit 43. A plurality of engagement holes 109, which are aligned in a line along the slit 43 of the first divided portion 44$i$, are provided in the vicinity of the slit 43. The engagement holes 109, 109 configure the engagement portions.

Pins 111, which project upward at the positions corresponding to the engagement holes 108, are arranged on the table 105. Pins 112, which project upward at the positions corresponding to the engagement holes 109, are formed on the table 105. The pins 111, 112 configure the engaging portions.

A pin drive mechanism (not shown), which selectively retracts and projects the pins 111, 112, is provided on the table 105. The pins 111, 112 are maintained in states inserted through the corresponding engagement holes 108, 109 until immediately before folding of the airbag 33 using the folding assist tool 107 is started. The pin drive mechanism operates to retract the pins 111, 112 from the engagement holes 108, 109 immediately before folding of the airbag 33 is started.

Operation of the airbag apparatus according to the third embodiment will hereafter be described.

First, the airbag 33 in a spread state is mounted on the table 105. At this stage, the pins 111, 112 of the table 105 are passed through the corresponding engagement holes 108, 109 of the first and second divided portions 44$o$, 44$i$. In the airbag 33 in the deployed state, the second and first divided portions 44$o$, 44*i*, which are located adjacently at both sides of the slit 43, are not joined together in the direction of the width of the vehicle. However, by passing the pins 111, 112 through the corresponding engagement holes 108, 109 as has been described, the second and first divided portions 44*o*, 44*i* are engaged with the pins 111, 112 through the associated engagement holes 108, 109. This positions the second and first divided portions 44*o*, 44*i* with respect to the table 105 through the pins 111, 112. As a result, when the airbag 33 is folded back using the folding assist tool 107 as the core, the second and first divided portions 44*o*, 44*i* do not displace from optimal positions easily.

The pins 111, 112 are continuously held in the corresponding engagement holes 108, 109 until immediately before folding of the airbag 33 is started. The pins 111, 112 are disengaged from the engagement holes 108, 109 before the airbag 33 is folded. Engagement through the pins 111, 112 is thus prevented from hampering folding of the airbag 33.

Thus, the third embodiment has the following advantages in addition to the advantages (1) to (4) of the first embodiment.

(6) The engagement holes 108, 109, which are aligned linearly along the slit 43 of the second and first divided portions 44*o*, 44*i*, are provided in the vicinity of the slit 43. Accordingly, by engaging the pins 111, 112 of the table 105 with the corresponding engagement holes 108, 109, the second and first divided portions 44*o*, 44*i* are positioned with respect to the table 105. As a result, without displacement of the second and first divided portions 44*o*, 44*i* from the optimal positions, the second and first divided portions 44*o*, 44*i* are optimally folded and layered in a volute shape.

(7) The pins 111, 112 projecting from the table 105 configure the engaging portions. The engagement holes 108, 109, which are selectively engaged with and disengaged from the pins 111, 112, configure the engagement portions. In this manner, the engaging portions and the engagement portions are simply configured.

The engaging portions and the engagement portions may be employed in the second embodiment. The advantages (6), (7) are obtained even in the case in which the displacement permitting portions are formed by the slit and the breakable portion as in the second embodiment.

Fourth Embodiment

Figure 17:
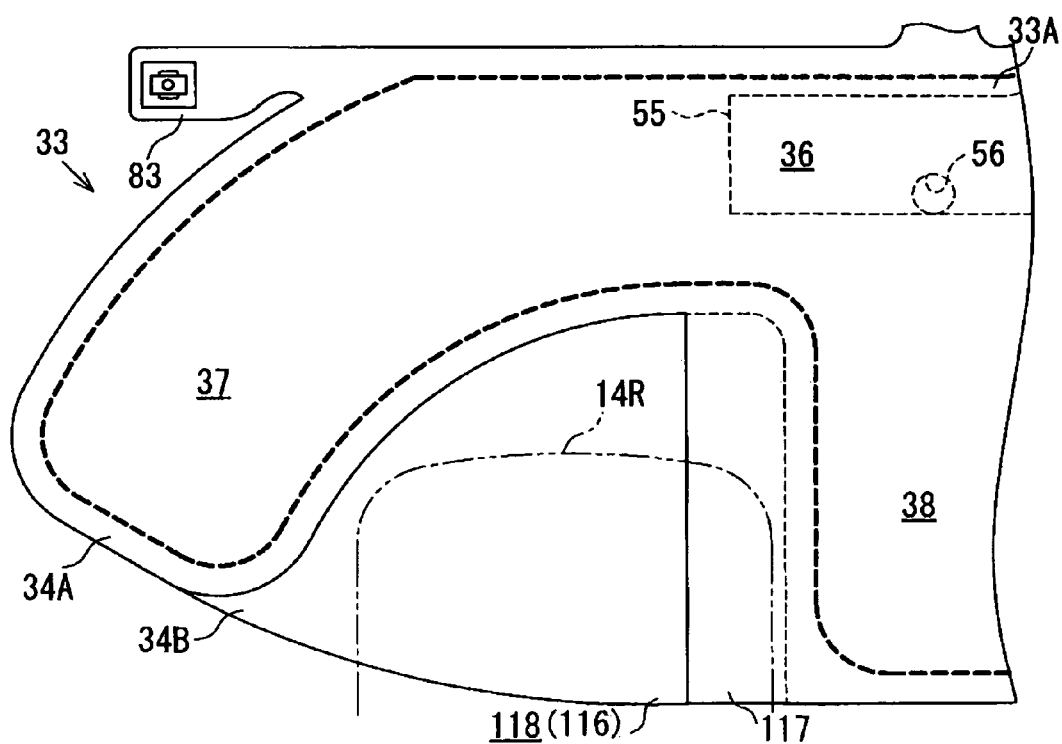
FIG. 17 is a front view showing a portion of an airbag apparatus according to a fourth embodiment of the present invention, illustrating a right non-inflatable portion.
Figure 18:
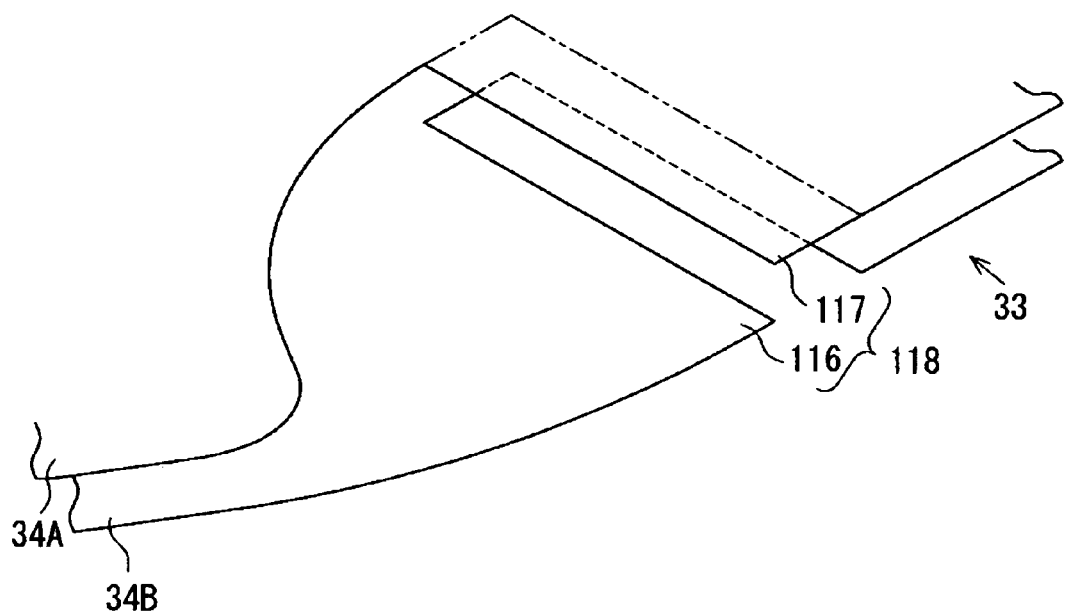
FIG. 18 is a perspective view showing a portion of the airbag apparatus illustrated in FIG. 17, illustrating both front and back fabric sheets of the airbag before the fabric sheets are sewn together.

An airbag apparatus according to a fourth embodiment of the present invention will now be described with reference to FIGS. 17 and 18. The fourth embodiment is different from the first embodiment in terms of the configurations of the non-inflatable portions and the displacement permitting portions. The non-inflatable portion and the displacement permitting portion at the right side are commonly configured with the non-inflatable portion and the displacement permitting portion at the left side. Accordingly, the configurations, operations, and advantages of the right non-inflatable portion and the right displacement permitting portion will be described herein and explanation of the left non-inflatable portion and the left displacement permitting portion will be omitted.

The fourth embodiment is different from the first embodiment in that the non-inflatable portion 118 of the fourth embodiment is constructed by the fabric sheet 34B at the backside and the fabric sheet 34A at the front side. Specifically, the non-inflatable portion 118 is configured by an outer piece 116, which is formed by the fabric sheet 34B at the backside, and an inner piece 117, which is formed by the fabric sheet 34A at the front side.

The outer piece 116 has an identical shape with the shape of the second divided portion 44*o* of the first embodiment and is separate from the intermediate vertical inflatable cell 38.

The inner piece 117 projects from the intermediate vertical inflatable cell 38 toward the side vertical inflatable cell 37 and has the identical shape with the shape of the first divided portion 44*i*. The inner piece 117 is separate from the side vertical inflatable cell 37 but located close to or held in contact with the outer piece 116.

The outer piece 116 and the inner piece 117 of the fourth embodiment are similar to the first divided portion 44*i* and the second divided portion 44*o* of the first embodiment, respectively. The outer piece 116 and the inner piece 117 configure a non-inflatable portion 118 having a displacement permitting portion.

In the fourth embodiment, the non-inflatable portion 118 and the displacement permitting portion are formed by the outer piece 116 and the inner piece 117. The two side vertical inflatable cells 37, 38, which are arranged adjacent to each other, are separated from each other at the non-inflatable portion 118 in the direction of the width of the vehicle. This permits outward displacement of the side vertical inflatable cell 37 in the direction of the width of the vehicle. The side vertical inflatable cell 37 displaces outward in the direction of the width of the vehicle even if the non-inflatable portion 118 contacts the headrest 14R. As a result, the non-inflatable portion 118 reliably deploys while extending beyond the headrest 14R, without being caught by the headrest 14R.

Accordingly, the fourth embodiment has the following advantage, which corresponds to the advantage (2), in addition to the advantages (1), (3), and (4) of the first embodiment.

(2') The outer piece 116 is provided in the side vertical inflatable cell 37 while separated from the intermediate vertical inflatable cell 38. The inner piece 117 is arranged in the intermediate vertical inflatable cell 38 while separated from the side vertical inflatable cell 37 and located close to or held in contact with the outer piece 116. The outer piece 116 and the inner piece 117 configure the non-inflatable portion 118 and the displacement permitting portion.

The outer piece 116 and the inner piece 117 thus permit outward displacement of the side vertical inflatable cell 37 in the direction of the width of the vehicle so that the advantage (1) is reliably obtained. Further, in the fourth embodiment, the non-inflatable portion 118 having the displacement permitting portion is provided by the simple structure having the outer piece 116 for the side vertical inflatable cell 37 and the inner piece 117 for the intermediate vertical inflatable cell 38.

The outer piece 116 and the inner piece 117 are arranged close to or held in contact with each other and located behind the headrest 14R. Accordingly, the configuration of the fourth embodiment also ensures the effect of receiving flying objects from behind the vehicle.

Fifth Embodiment

Figure 19:
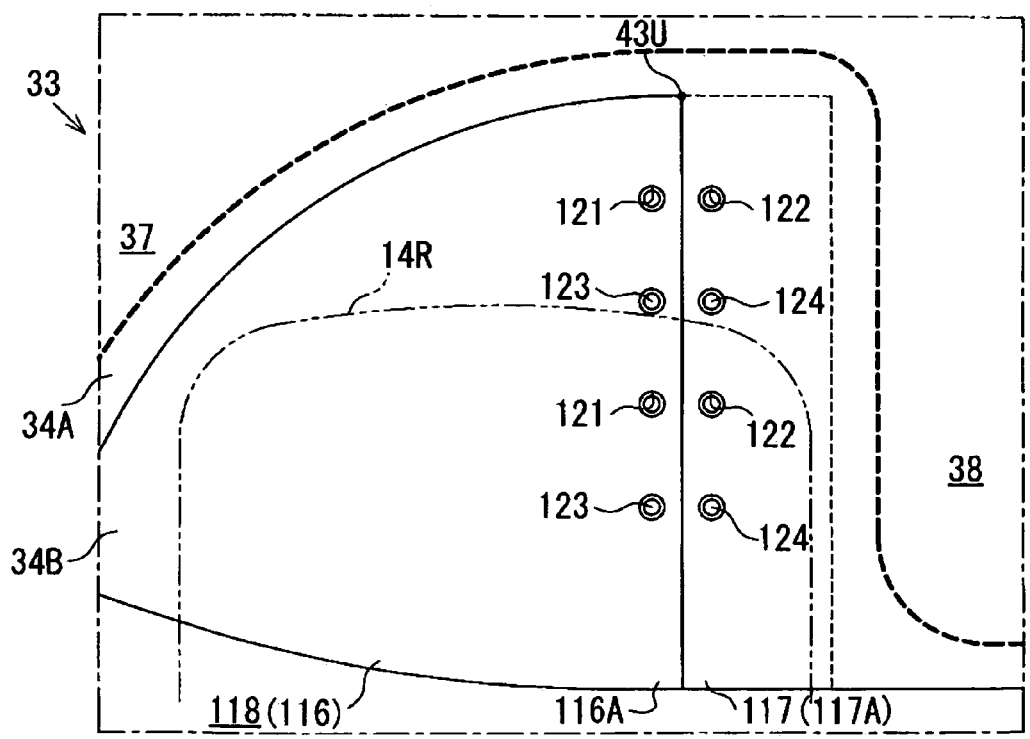
FIG. 19 is a front view showing a portion of an airbag apparatus according to a fifth embodiment of the present invention, illustrating a right non-inflatable portion and pins.
Figure 20:
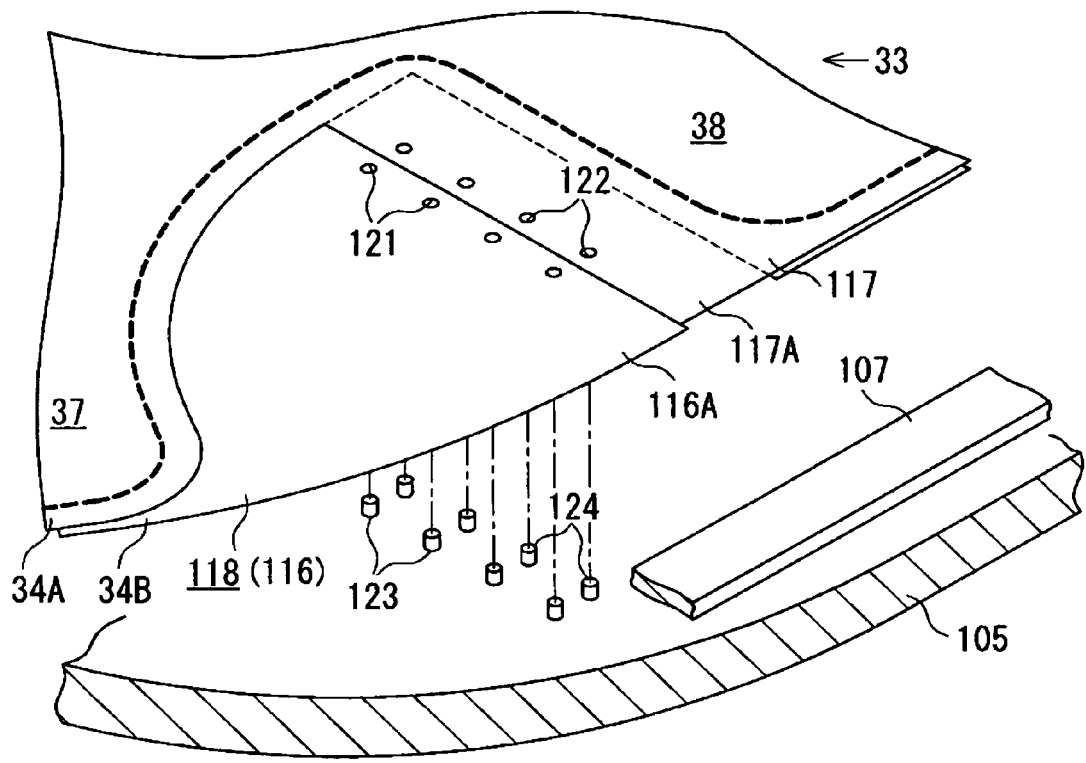
FIG. 20 is a perspective view showing a portion of the airbag apparatus illustrated in FIG. 19, representing the relationship among a right non-inflatable portion, a table, and a folding assist tool.

An airbag apparatus according to a fifth embodiment of the present invention will now be described with reference to FIGS. 19 and 20.

The airbag apparatus of the fifth embodiment is configured by combining the third embodiment with the fourth embodiment. Specifically, in the fifth embodiment, a plurality of engagement holes 121 and a plurality of engagement holes 122, which are similar to the corresponding components of the third embodiment, are formed in the outer piece 116 and the inner piece 117, respectively, of the fourth embodiment.

The engagement holes 121 are arranged in a lateral peripheral portion 116A of the outer piece 116 and aligned in a line along the deploying direction of the non-inflatable portion 118. The engagement holes 122 are provided in a lateral peripheral portion 117A of the inner piece 117 and aligned in a line along the deploying direction of the non-inflatable portion 118. The engagement holes 121, 122 configure engagement portions.

The table 105 has pins 123, 124 like the corresponding components of the third embodiment. The pins 123 are engaged with the corresponding engagement holes 121 and the pins 124 are engaged with the corresponding engagement holes 122. The pins 123, 124 configure engaging portions.

The fifth embodiment has the following advantages in addition to the advantages (1), (2'), (3), and (4) of the third and fourth embodiments.

(8) The engagement holes 121 are provided in the lateral peripheral portion 116A of the outer piece 116 located close to the inner piece 117. The engagement holes 122 are defined in the lateral peripheral portion 117A of the inner piece 117 located close to the outer piece 116. Accordingly, through engagement between the pins 123, 124 of the table 105 with the engagement holes 121, 122, the outer piece 116 and the inner piece 117 are positioned with respect to the table 105. As a result, the outer piece 116 and the inner piece 117 are optimally folded in the volute shape without being displaced from optimal positions.

(9) The pins 123, 124 projecting from the table 105 configure the engaging portions. The engagement holes 121, 122, which are selectively engaged with and disengaged from the corresponding pins 123, 124, form the engagement portions. That is, the engaging portions and the engagement portions are constructed simply.

Sixth Embodiment

Figure 21:
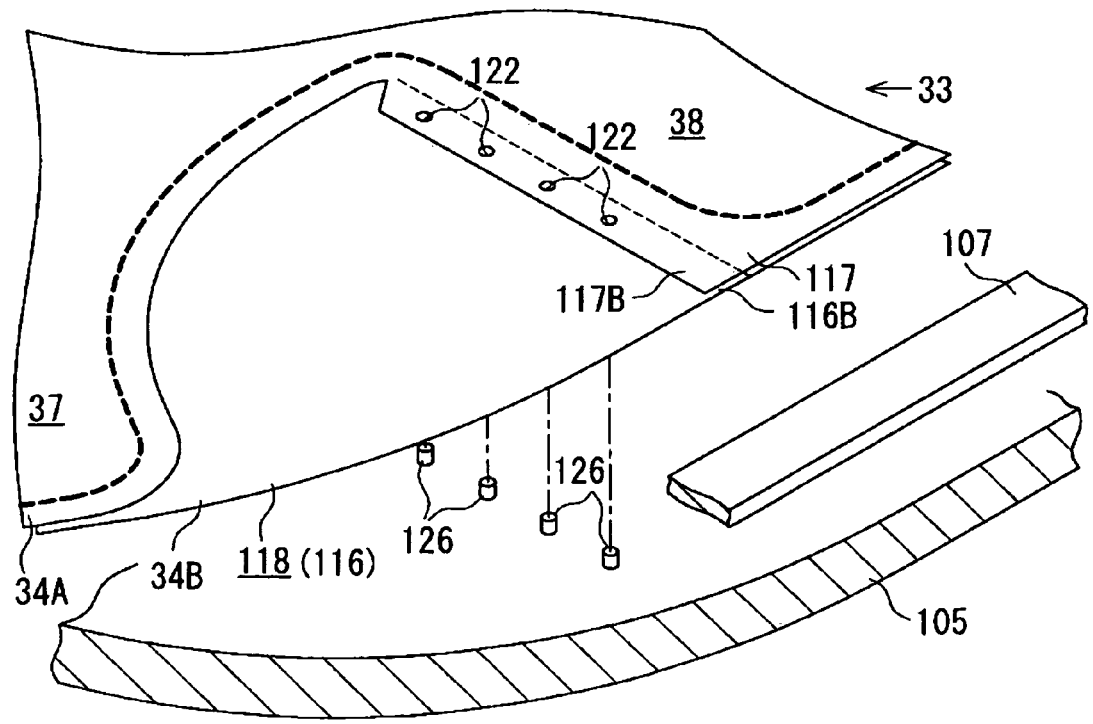
FIG. 21 is a perspective view showing a portion of an airbag apparatus according to a sixth embodiment of the present invention, representing the relationship among a right non-inflatable portion, a table, and a folding assist tool.
Figure 22:
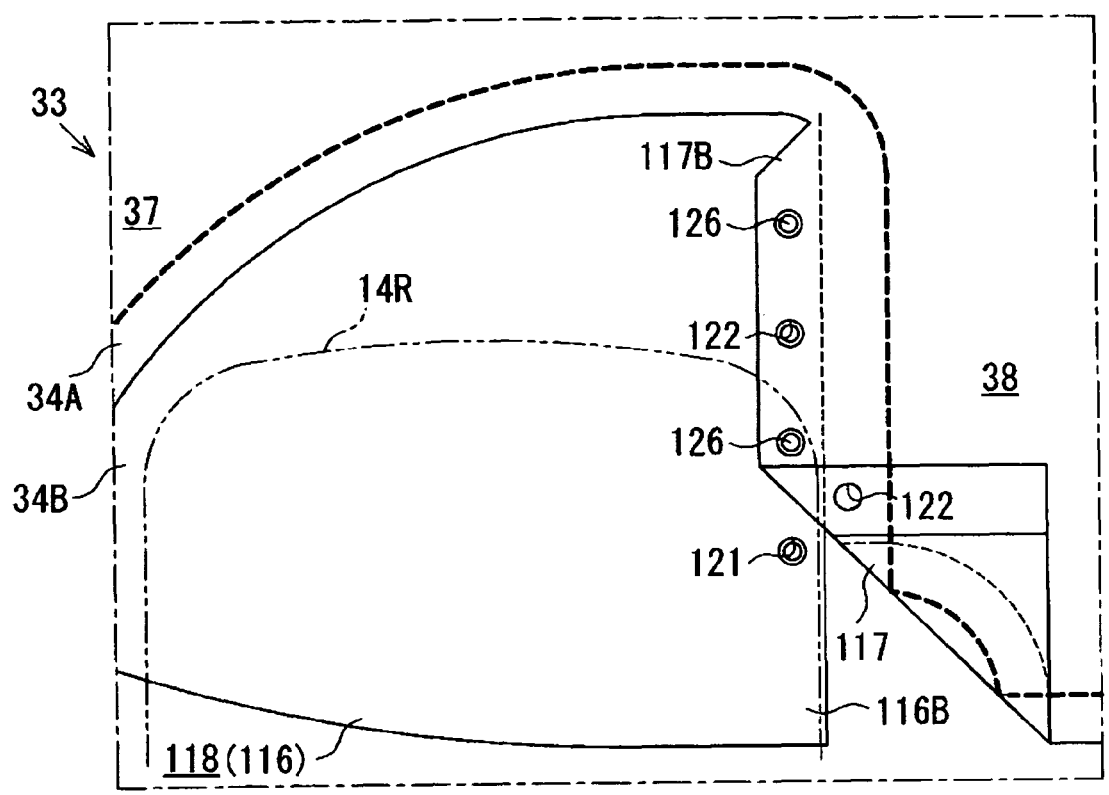
FIG. 22 is a front view showing a portion of the airbag apparatus illustrated in FIG. 21, illustrating a right non-inflatable portion.

An airbag apparatus according to a sixth embodiment of the present invention will hereafter be described with reference to FIGS. 21 and 22.

The sixth embodiment is different from the fifth embodiment in that the outer piece 116 and the inner piece 117 are formed in such a manner that the position of each engagement hole 121 coincides with the position of the corresponding engagement hole 122. Specifically, at least a portion of the outer piece 116 and at least a portion of the inner piece 117 of the right non-inflatable portion 118 overlap each other in the direction of the width of the vehicle. In other words, a lateral peripheral portion 116B of the outer piece 116 closer to the inner piece 117 overlaps a lateral peripheral portion 117B of the inner piece 117 closer to the outer piece 116. The lateral peripheral portion 116B corresponds to the portion of the outer piece 116 overlapping the inner piece 117 and the lateral peripheral portion 117B corresponds to the portion of the inner piece 117 overlapping the outer piece 116. Although not described, the outer piece and the inner piece of the left non-inflatable portion are configured in the same manner as the corresponding components of the right non-inflatable portion. In FIG. 22, a portion (a lower portion) of the intermediate vertical inflatable cell 38 including the lateral peripheral portion 117B is illustrated in a bent state in order to include the lateral peripheral portion 116B and the one of the engagement holes 121 in the drawing.

When the lateral peripheral portions 116B, 117B overlap each other, the engagement holes 122 are located coaxially with the corresponding engagement holes 121.

A plurality of pins 126, each serving as an engaging portion projecting upward, are provided on the table 105 at the positions corresponding to the engagement holes 121, 122. The pins 126 are aligned linearly. In other words, the sixth embodiment is different from the fifth embodiment, which has the pins 123, 124 that are aligned along the two corresponding lines, in that the pins 126 are aligned along a single line.

In the sixth embodiment, each one of the pins 126 is passed through both the corresponding one of the engagement holes 121 of the outer piece 116 and the corresponding one of the engagement holes 122 of the inner piece 117. In this manner, the outer piece 116 and the inner piece 117 are engaged with the table 105 in states positioned with respect to the table 105.

If the lateral peripheral portions 116B, 117B do not overlap, the pins 123 passed through the engagement holes 121 must be provided independently from the pins 124 inserted through the engagement holes 122. In this regard, the sixth embodiment is configured in such a manner that the positions of the engagement holes 122 of the lateral peripheral portion 117B coincide with the positions of the corresponding engagement holes 121 of the lateral peripheral portion 116B. As a result, the pins 126 are passed through both the engagement holes 121 of the outer piece 116 and the engagement holes 122 of the inner piece 117.

The pins 126 are continuously maintained in the engagement holes 121, 122 until immediately before the airbag 33 is folded back. When the airbag 33 is folded back, the pins 126 are disengaged from the engagement holes 121, 122. Accordingly, folding of the airbag 33 is not interfered with engagement through the pins 126.

Thus, the sixth embodiment has the following advantage in addition to the advantages (1), (2'), (3), (4), (8), and (9) of the fifth embodiment.

(10) The engagement holes 121 are defined in the portion (the lateral peripheral portion 116B) of the outer piece 116 overlapping the inner piece 117. The engagement holes 122 are provided in the portion (the lateral peripheral portion 117B) of the inner piece 117 overlapping the outer piece 116. The engagement holes 121, 122 permit the common pins 126 to be selectively inserted through and disengaged from the engagement holes 121, 122. The engagement holes 121, 122 configure engagement portions. As a result, the number of the pins 126 necessary for engaging the outer piece 116 and the inner piece 117 with the table 105 is reduced to a half of that in the case in which there is no overlapping portion between the outer piece 116 and the inner piece 117.

The present invention may be modified as follows.

A bellows-like portion serving as a displacement permitting portion may be formed in the non-inflatable portion. The bellows-like portion is provided by folding the non-inflatable portion in the direction of the width of the vehicle. This permits outward displacement of the side vertical inflatable cells 37, 40 in the direction of the width of the vehicle.

A plurality of slits 43, 47 may be formed in the corresponding non-inflatable portions 41, 45.

The upper end 43U of the slit 43 of the non-inflatable portion 41 and the upper end 47U of the slit 47 of the non-inflatable portion 45 may be arranged at positions lower than the positions of the first embodiment.

Fluid different from the inflation gas G may be employed as inflation fluid. Correspondingly, an inflator constructed differently from the inflator 31 may be used as an inflation fluid generator.

The present invention may be used in an airbag apparatus without an inner tube 51 in the airbag 33.

The present invention may be employed in any suitable airbag apparatus using an airbag in which an inflatable portion is arranged in the vicinity of a lateral side of each headrest 14L, 14R and a non-inflatable portion is located behind the headrest 14L, 14R.

The present invention may be used in not only a vehicle in which the rear seat 12 is provided forward from and in the vicinity of the rear window glass 28, but also a vehicle in which the rear seat 12 is greatly spaced forward from the rear window glass 28. For example, the invention may be employed in a vehicle having a large-sized cargo area arranged between the rear seat 12 and the rear window glass 28.

Therefore, the present examples and embodiments are to be considered as illustrative and not restrictive and the invention is not to be limited to the details given herein, but may be modified within the scope and equivalence of the appended claims.

What is claimed is:

1. An airbag apparatus for use in a vehicle, the apparatus comprising:
    an inflation fluid generator accommodated in an accommodation portion formed in a space over a ceiling of a passenger compartment of the vehicle, the inflation fluid generator jetting out inflation fluid in response to an impact on the vehicle from behind; and
    an airbag that is accommodated in the accommodation portion in a folded state and has a proximal portion fixed to the vehicle, wherein the airbag is connected to the inflation fluid generator and, by receiving at the proximal portion the inflation fluid supplied from the inflation fluid generator in response to the impact on the vehicle from behind, shoots out of the accommodation portion toward a rear portion of the passenger compartment and in a diagonally downward direction, and deploys and inflates behind a rearmost seat with the proximal portion maintained in the accommodation portion,
    wherein a plurality of inflatable portions and a plurality of non-inflatable portions are defined in the airbag, wherein the inflatable portions are deployed and inflated by the inflation fluid in the vicinity of a lateral side of a headrest of the rearmost seat, and each non-inflatable portion is made of a fabric sheet, arranged between an adjacent pair of the inflatable portions, and deployed behind the headrest without being inflated by the inflation fluid,
    wherein the inflatable portions include a pair of side inflatable portions arranged at both outer sides in a direction of the width of the vehicle, and wherein each non-inflatable portion is provided with a displacement permitting portion permitting outward displacement of the corresponding one of the side inflatable portions in the direction of the width of the vehicle,
    wherein the inflatable portions include an intermediate inflatable portion arranged adjacent to and inward from the side inflatable portions in the direction of the width of the vehicle
    wherein each non-inflatable portion and the associated displacement permitting portion include a non-inflatable outer piece and a non-inflatable inner piece, wherein the non-inflatable outer piece is provided in the corresponding side inflatable portion while being separated from the intermediate inflatable portion, and the non-inflatable inner piece is formed in the intermediate inflatable portion while being separated from the side inflatable portion and located close to or held in contact with the outer piece,
    wherein each outer piece includes a lateral peripheral portion arranged close to the inner piece, each inner piece having a lateral peripheral portion located close to the outer piece, and wherein a plurality of engagement portions are provided in the lateral peripheral portion of the outer piece and the lateral peripheral portion of the inner piece, the engagement portions being used to position the outer piece and the inner piece when the airbag in the spread state is folded,
    wherein each inner piece and the corresponding outer piece each include a portion overlapping each other in the direction of the width of the vehicle, and
    wherein the engagement portions are a plurality of engagement holes, the engagement holes being formed both in the portion of the outer piece overlapping the inner piece and the portion of the inner piece overlapping the outer piece, the positions of the engagement holes of the outer piece coinciding with the positions of the engagement holes of the inner piece, the engagement holes of the outer piece and the engagement holes of the inner piece functioning as a plurality of common engagement holes.

2. The airbag apparatus according to claim 1,
    wherein the airbag in a spread state is folded by:
    mounting the airbag in the spread state on a table having one or more engaging portions;
    positioning the airbag in the spread state by engaging the engaging portions of the table with the engagement holes of the airbag; and
    folding the airbag in a volute shape from the distal edge of each non-inflatable portion toward the proximal portion of the non-inflatable portion using an elongated folding assist tool as a core, the non-inflatable portion being engaged with the engagement holes until immediately before the airbag is folded back.

3. The apparatus according to claim 2,
    wherein the engaging portions are formed by a plurality of pins that are aligned in a line and project from the table, the engagement holes permitting the pins to be selectively inserted through and disengaged from the corresponding engagement holes, and wherein the positioning of the airbag is carried out by passing the pins through the corresponding engagement holes.

* * * * *